(12) United States Patent
Ahn

(10) Patent No.: US 7,221,424 B2
(45) Date of Patent: May 22, 2007

(54) LIQUID CRYSTAL DISPLAY HAVING A HORIZONTAL ELECTRIC FIELD AND CAPSULATED PADS AND METHOD OF FABRICATING THE SAME

(75) Inventor: Byung Chul Ahn, Ahnyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 119 days.

(21) Appl. No.: 10/815,766

(22) Filed: Apr. 2, 2004

(65) Prior Publication Data
US 2004/0196228 A1 Oct. 7, 2004

(30) Foreign Application Priority Data
Apr. 3, 2003 (KR) .............................. 10-03-21117

(51) Int. Cl.
*G02F 1/1343* (2006.01)
(52) U.S. Cl. ..................................... 349/141
(58) Field of Classification Search ............... 349/141, 349/149–152
See application file for complete search history.

(56) References Cited

U.S. PATENT DOCUMENTS

| | | | | |
|---|---|---|---|---|
| 5,028,841 A * | 7/1991 | Disanto et al. | ............. | 313/505 |
| 5,717,476 A * | 2/1998 | Kanezawa | .................. | 349/149 |
| 6,151,091 A * | 11/2000 | Muramatsu | ................. | 349/149 |
| 6,400,436 B1 * | 6/2002 | Komatsu | .................... | 349/141 |
| 2003/0133067 A1 * | 7/2003 | Park et al. | .................. | 349/141 |
| 2003/0202150 A1 * | 10/2003 | Lee | ............................. | 349/149 |

* cited by examiner

*Primary Examiner*—David Nelms
*Assistant Examiner*—Timothy L. Rude
(74) *Attorney, Agent, or Firm*—McKenna Long & Aldridge LLP

(57) ABSTRACT

A liquid crystal display having a horizontal electric field includes:

a thin film transistor array substrate, wherein the thin film transistor array substrate includes an effective display area having a gate line, a common line parallel to the gate line, a data line crossing and isolated from the gate line and the common line with a gate insulating film therebetween to define a pixel area, a thin film transistor formed at each crossing of the gate line and the data line, a passivasion film to protect the thin film transistor, a common electrode formed in the pixel area and connected to the common line and a pixel electrode connected to the thin film transistor, and a pad area having a gate pad having at least one conductive layer included in the gate line, a data pad having at least one conductive layer included in the data line, a common pad having at least one conductive layer included in the common line; a color filter array substrate combined with the thin film transistor array substrate to face each other; a driving integrated circuit mounted on the thin film transistor substrate to directly connect to one of the gate pad and the data pad; and a package mold material capsulating the pads and the driving integrated circuit.

24 Claims, 36 Drawing Sheets

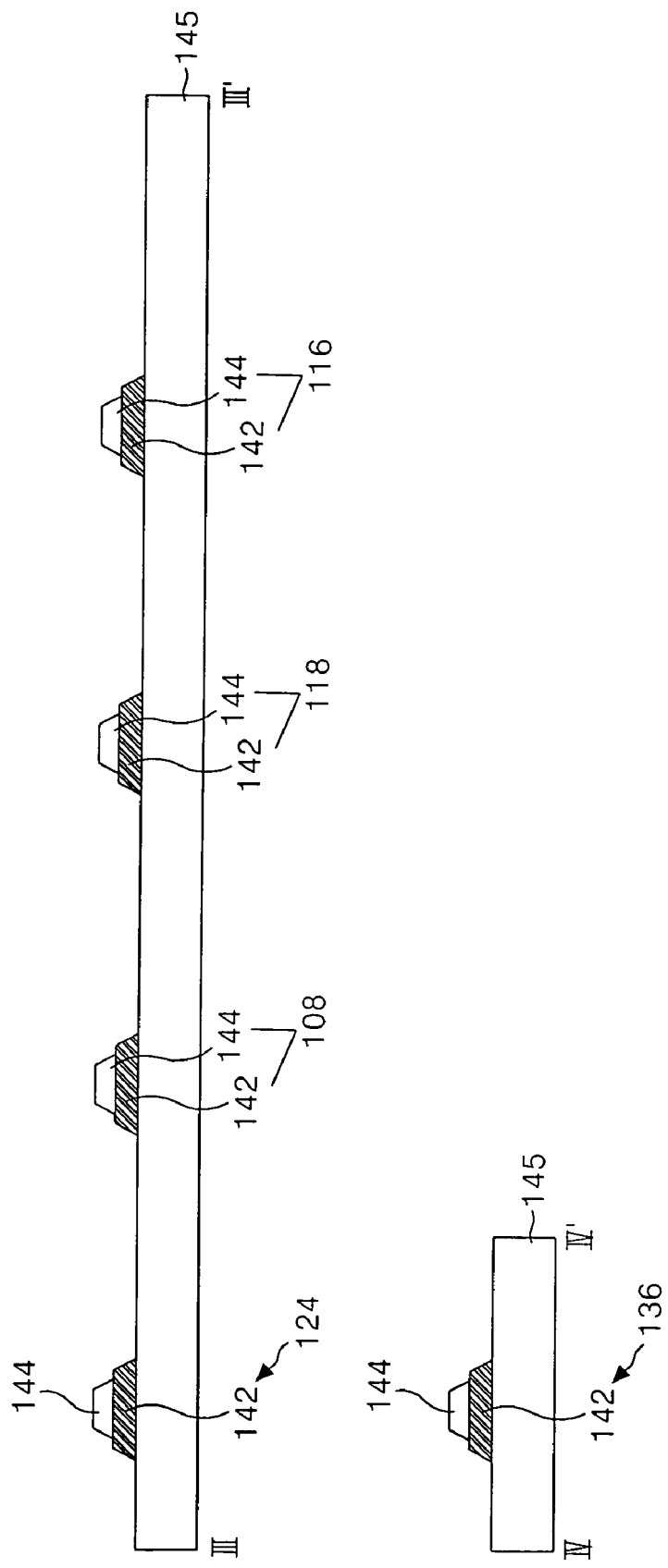

FIG.8A
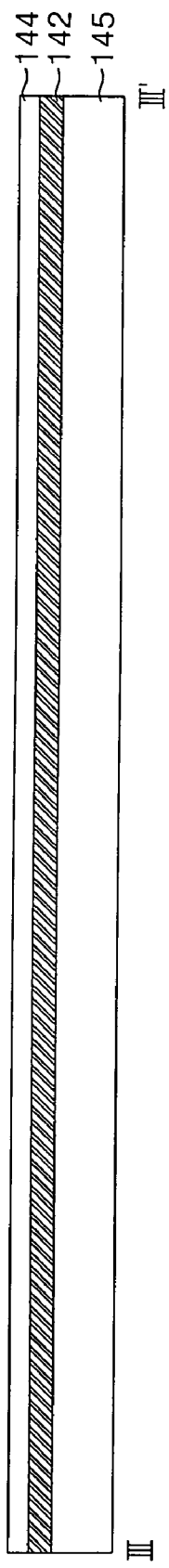
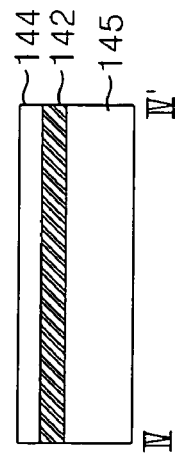

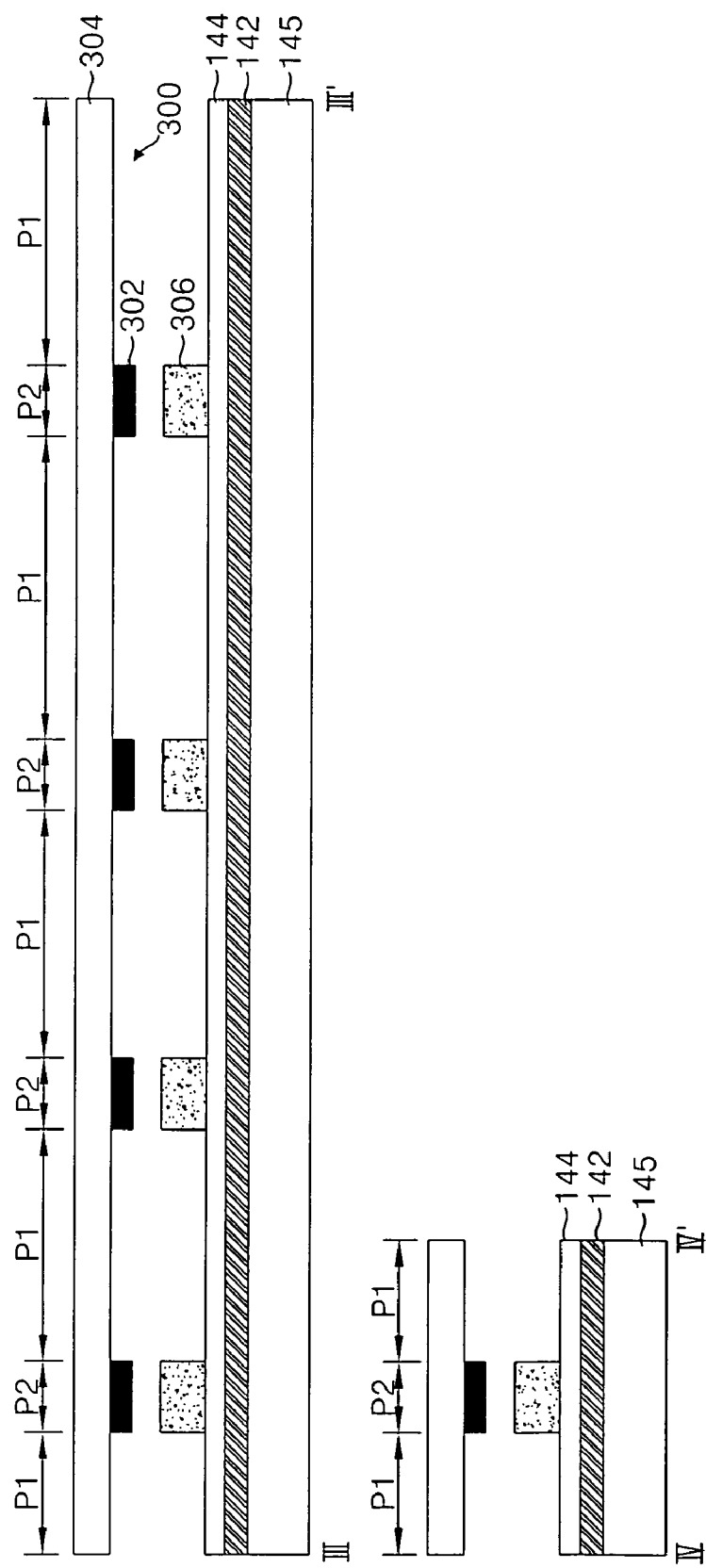

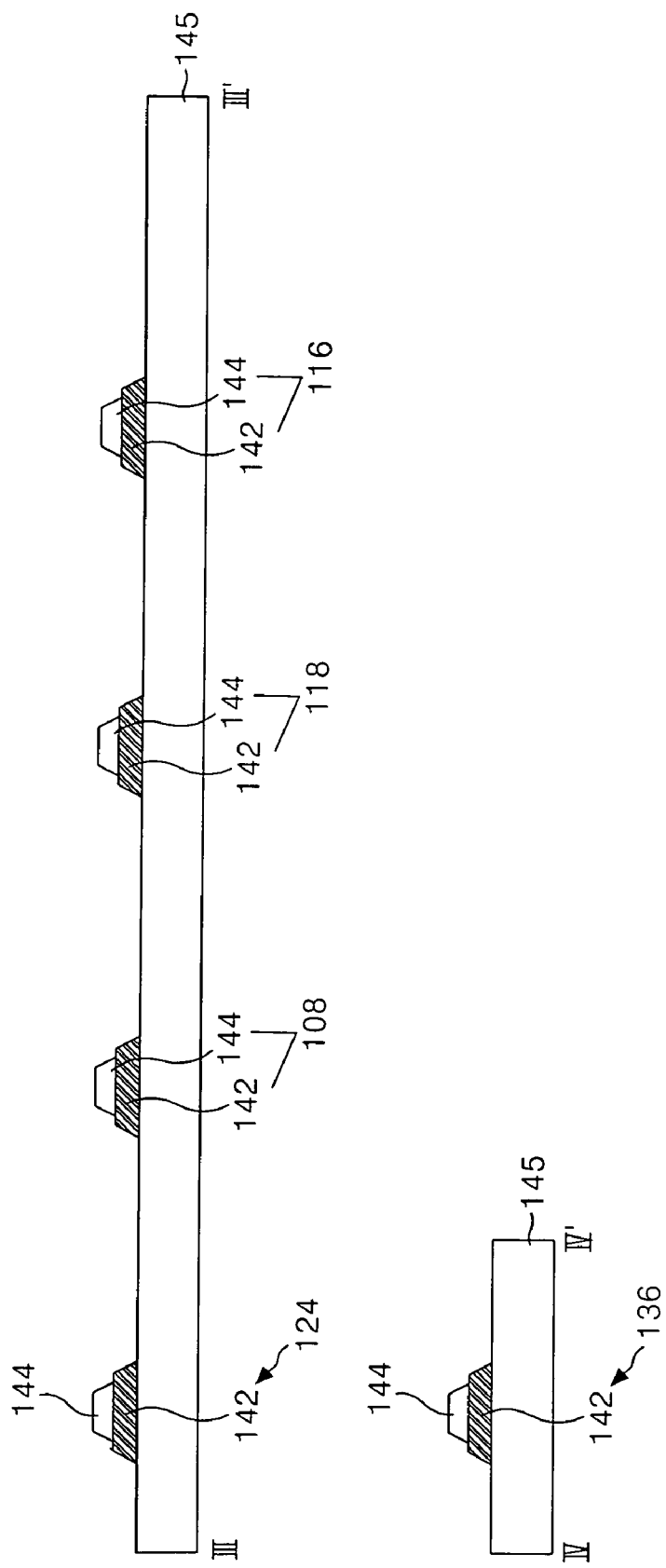

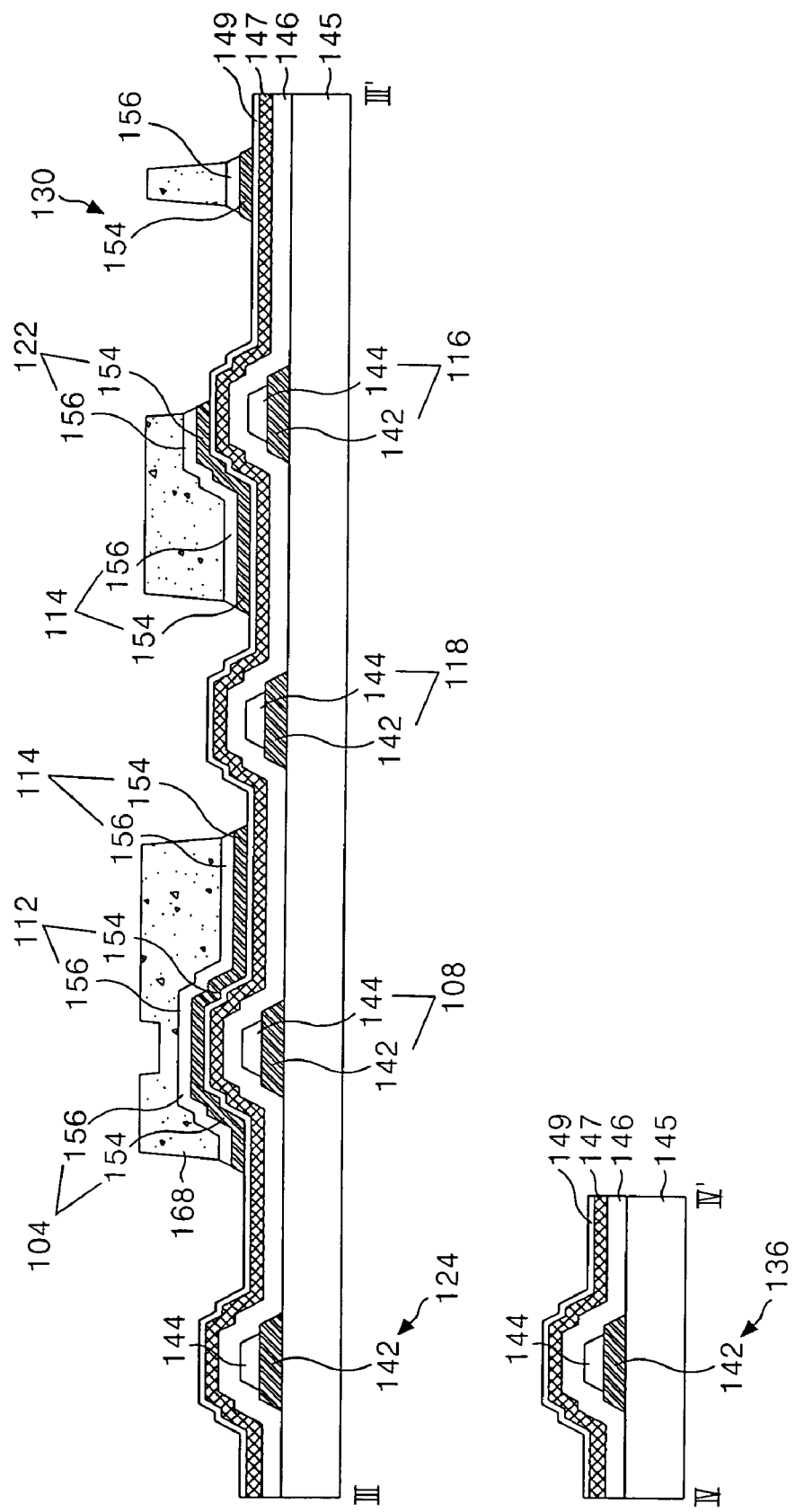

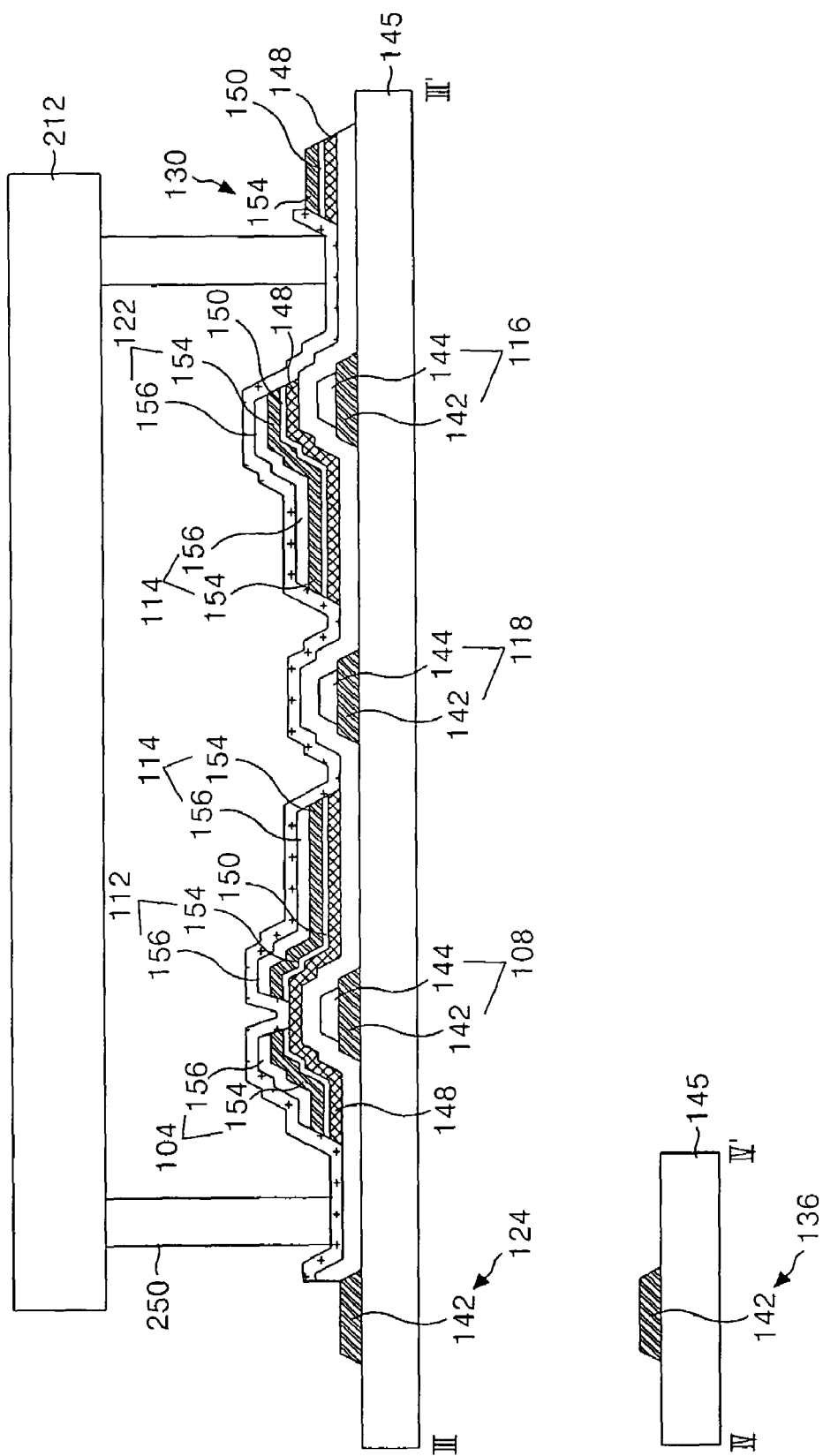

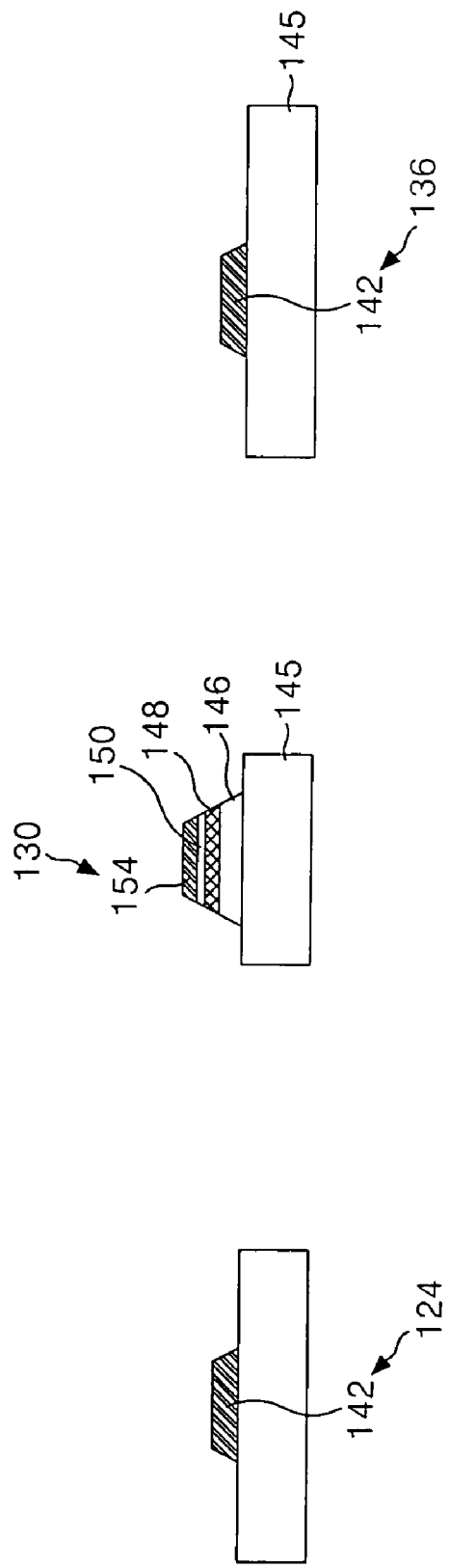

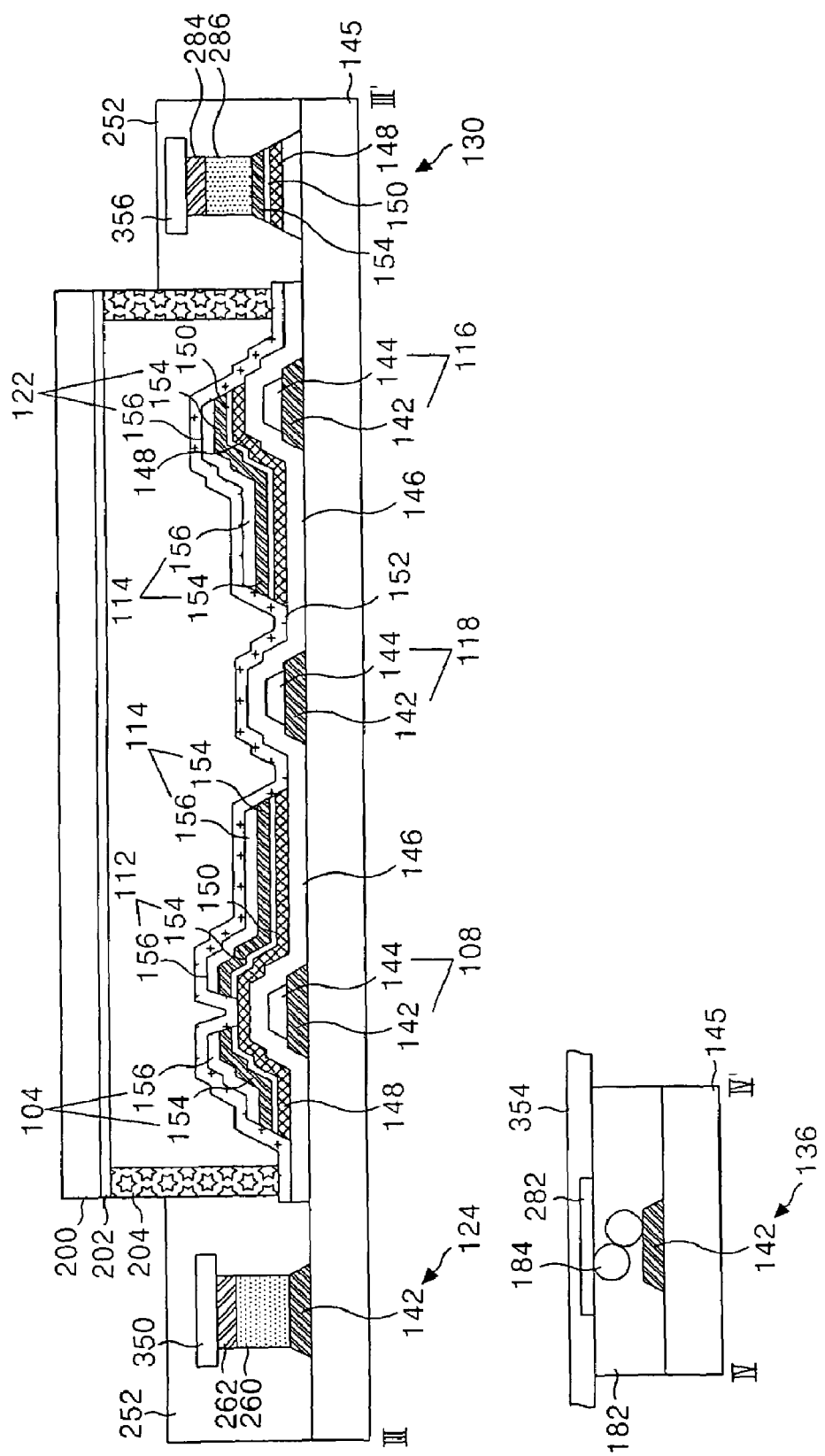

LIQUID CRYSTAL DISPLAY HAVING A HORIZONTAL ELECTRIC FIELD AND CAPSULATED PADS AND METHOD OF FABRICATING THE SAME

This application claims the benefit of the Korea Patent Application No. P03-21117 filed on Apr. 3, 2003, which is hereby incorporated by reference.

BACKGROUND OF THE INVENTION

1. Field of the Invention

The present invention relates to a liquid crystal display using horizontal electric field, and more particularly to a liquid crystal display and a fabricating method thereof that are capable of reducing the number of mask processes.

2. Description of the Related Art

Generally, liquid crystal displays (LCDs) control light transmittance of liquid crystal material using an electric field to thereby display a picture. The liquid crystal displays are classified into a vertical electric field type and a horizontal electric field type in accordance with a direction of the electric field driving the liquid crystal.

The liquid crystal display of vertical electric field type, in which a common electrode formed on an upper substrate and a pixel electrode formed on a lower substrate are arranged as facing each other, drives a liquid crystal of a twisted nematic mode (TN) by a vertical electric field formed between the common electrode and the pixel electrode. The liquid crystal display of vertical electric field type has an advantage of a large aperture ratio, while it has a defect of a narrow viewing angle about 90°.

The liquid crystal display of horizontal electric field type drives a liquid crystal of in plane switch (hereinafter referred to as "IPS") mode by a horizontal electric field between the pixel electrode and the common electrode disposed in parallel on the lower substrate. The liquid crystal display of horizontal electric field type has an advantage of an wide viewing angle about 160°. Hereinafter, the liquid crystal display of horizontal electric field type will be described in detail.

The liquid crystal display of the horizontal electric field type comprises a thin film transistor array substrate (a lower substrate) and a color filter array substrate (an upper substrate) as faced and joined each other, a spacer for uniformly maintaining a cell gap between two substrates and a liquid crystal injected into a space provided by the spacer.

The thin film transistor array substrate includes a plurality of signal lines for forming a horizontal electric field on a basis of a pixel, a plurality of thin film transistors, and an alignment film applied for a liquid crystal alignment thereon. The color filter array substrate includes a color filter for representing a color, a black matrix for preventing a light leakage and an alignment film applied for a liquid crystal alignment thereon.

In such a liquid crystal display, since the thin film transistor array substrate involves a semiconductor process and requires a plurality of mask processes, the manufacturing process is complicate to be a major rise factor in the manufacturing cost of the liquid crystal display panel. In order to solve this, the thin film transistor array substrate has been developed toward a reduction in the number of mask processes. This is because one mask process includes a lot of processes such as thin film deposition, cleaning, photolithography, etching, photo-resist stripping and inspection processes, etc. Recently, there has been highlighted a four-round mask process in which one mask process is reduced from the existent five-round mask process that is employed as a standard mask process.

FIG. 1 is a plan view illustrating a related art thin film transistor substrate of horizontal electric type using the four-round mask process, and FIG. 2 is a sectional view of the thin film transistor array substrate taken along the I–I' and II–II' line in FIG. 1.

Referring to FIGS. 1 and 2, the related art thin film transistor array substrate of horizontal electric type comprises a gate line 2 and a data line 4 formed on a lower substrate 45 in such a manner to intersect each other, a thin film transistor 6 formed at each intersection, a pixel electrode 14 and a common electrode 18 formed in order to apply the horizontal electric field in a pixel regions defined by the intersection and a common line 16 connected to the common electrode 18. Moreover, the related art thin film transistor array substrate further comprises a storage capacitor 20 formed at an overlapped portion between the pixel electrode 14 and the common line 16, a gate pad 24 connected to the gate line 2, and a data pad 30 connected to the data line 4 and a common pad 36 connected to the common line 16.

The gate line 2 supplies a gate signal to the gate electrode 8 of the thin film transistor 6. The data line 4 supplies a pixel signal to the pixel electrode 14 via a drain electrode 12 of the thin film transistor 6. The gate line 2 and the data line 4 are formed in an intersection structure to thereby define the pixel region 5.

The common line 16 is formed in parallel with the gate line 2 with the pixel region 5 positioned between the common line 16 and the gate line 2 to supply a reference voltage for driving the liquid crystal to the common electrode 18.

The thin film transistor 6 responds to the gate signal of the gate line 2 so that the pixel signal of the data line 4 is charged to the pixel electrode 14. To this end, the thin film transistor 6 comprises a gate electrode 8 connected to the gate line 2, a source electrode 10 connected to the data line 4 and a drain electrode 12 connected to the pixel electrode 14. Further, the thin film transistor 6 includes an active layer 48 overlapping with the gate electrode 8 with a gate insulating film 46 positioned between the thin film transistor 6 and the gate electrode 8 and defining a channel between the source electrode 10 and the drain electrode 12. The active layer 48 is formed to overlap with the data line 4, a data pad lower electrode 32 and a storage electrode 22. On the active layer 48, an ohmic contact layer 50 for making an ohmic contact with the data line 4, the source electrode 10, the drain electrode 12, the data pad lower electrode 32 and the storage electrode 22 is further formed.

The pixel electrode 14, which is connected to the drain electrode 12 of the thin film transistor 6 via a first contact hole 13 passing through a passivation film 52, is formed in the pixel region 5. Particularly, the pixel electrode 14 comprises a first horizontal part 14A connected to the drain electrode 12 and formed in parallel with adjacent gate line 2 and a second horizontal part 14B formed to overlap with the common line 16 and a finger part 14C formed in parallel with the common electrode 18.

The common electrode 18 is connected to the common line 16 and is formed in the pixel region 5. In addition, the common electrode 18 is formed in parallel with the finger part 14C of the pixel electrode 14 in the pixel region 5.

Accordingly, a horizontal electric field is formed between the pixel electrode 14 to which the pixel signal is supplied via the thin film transistor 6 and the common electrode 18 to which the reference voltage is supplied via the common line 16. Moreover, the horizontal electric field is formed between the finger part 14C of the pixel electrode 14 and the common electrode 18. The liquid crystal molecules arranged in the horizontal direction between the thin film transistor array substrate and the color filter array substrate by the horizontal electric field becomes to rotate due to a dielectric anisotropy. The light transmittance transmitting the pixel region 5 differs in accordance with a rotation amount of the liquid crystal molecules and thereby the pictures can be represented.

The storage capacitor 20 consists of the common line 16, a storage electrode 22 overlapping with the common line 16 with the gate insulating film 46, the active layer 48 and the ohmic contact layer 50 positioned therebetween, and a pixel electrode 14 connected via a second contact hole 21 passing through the storage electrode 22 and the passivation film 52. The storage capacitor 20 allows a pixel signal charged in the pixel electrode 14 to be maintained stably until the next pixel signal is charged.

The gate line 2 is connected, via the gate pad 24, to a gate driver (not shown). The gate pad 24 consists of a gate pad lower electrode 26 extended from the gate line 2, and a gate pad upper electrode 28 connected, via a third contact hole 27 passing through the gate insulating film 46 and the passivation film 52, to the gate pad lower electrode 26.

The data line 4 is connected, via the data pad 30, to the data driver (not shown). The data pad 30 consists of a data pad lower electrode 32 extended from the data line 4, and a data pad upper electrode 34 connected, via a fourth contact hole 33 passing through the passivation film 52, to the data pad lower electrode 32.

The common line 16 supplied with the reference voltage from the reference voltage source of exterior (not shown) via the common pad 36. The common pad 36 consists of a common pad lower electrode 38 extended from the common line 16, and a common pad upper electrode 40 connected, via a fifth contact hole 39 passing through the gate insulating film 46 and the passivation film 52, to the common pad lower electrode 38.

A method of fabricating the thin film transistor substrate having the above-mentioned structure using the four-round mask process will be described in detail with reference to FIGS. 3A to 3D.

Referring to FIG. 3A, a first conductive pattern group including the gate line 2, the gate electrode 8 and the gate pad lower electrode 26 is formed on the lower substrate 45 using the first mask process.

More specifically, a first metal layer 42 and a second metal layer 44 are sequentially formed on the upper substrate 45 by a deposition technique such as a sputtering to form a gate metal layer of double-structure. Then, the gate metal layer is patterned by the photolithography and the etching process using a first mask to thereby form the first conductive pattern group including the gate line 2, the gate electrode 8, the gate pad lower electrode 26, the common line 16, common electrode 18 and the common pad lower electrode 38. Herein, the first metal layer 42 is formed with an aluminum system metal and the second metal layer 44 is formed with a chrome (Cr) or a molybdenum (Mo).

Referring to FIG. 3B, the gate insulating film 46 is formed on the lower substrate 45 provided with the first conductive pattern group. Further, a semiconductor pattern group including the active layer 48 and the ohmic contact layer 50 and a second conductive pattern group including the data line 4, the source electrode 10, the drain electrode 12, the data pad lower electrode 32 and the storage electrode 22 are formed on the gate insulating film 46 using the second mask process.

More specifically, the gate insulating film 46, a first semiconductor layer, a second semiconductor layer and a data metal layer are sequentially formed on the lower substrate 45 provided with the first conductive pattern group by deposition techniques such as the plasma enhanced chemical vapor deposition (PECVD) and the sputtering, etc. Herein, the gate insulating film 46 is made of an inorganic insulating material such as silicon oxide ($SiO_x$) or silicon nitride ($SiN_x$). The first semiconductor layer is made of amorphous silicon that an impurity is not doped and the second conductor layer is made of amorphous silicon that an impurity of a N type or P type is doped. The data metal layer is made of a molybdenum (Mo), a titanium (Ti), tantalum (Ta) or a molybdenum alloy, etc.

Then, a photo-resist pattern is formed on the data metal layer by the photolithography using a second mask. In this case, a diffractive exposure mask having a diffractive exposing part at a channel portion of the thin film transistor is used as a second mask, thereby allowing a photo-resist pattern of the channel portion to have a lower height than other photo-resist patterns of region portions.

Subsequently, the data metal layer is patterned by a wet etching process using the other photo-resist patterns to thereby provide the data pattern including the data line 4, the source electrode 10, the drain electrode 12 being integral to the source electrode 10 and the storage electrode 22.

Next, the first semiconductor layer and the second semiconductor layer are patterned at the same time by a dry etching process using the same photo-resist pattern to thereby provide the ohmic contact layer 50 and the active layer 48.

The photo-resist pattern having a relatively low height is removed from the channel portion by the ashing process and thereafter the source electrode, the drain electrode and the ohmic contact layer 50 of the channel portion are etched by the dry etching process. Thus, the active layer 48 of the channel portion is exposed to separate the source electrode 10 from the drain electrode 12.

Thereafter, a remainder of the photo-resist pattern on the second conductive pattern group is removed using the stripping process.

Referring to FIG. 3C, the passivation film 52 including first to fifth contact holes 13, 21, 27, 33 and 39 are formed on the gate insulating film 46 provided with the second conductive pattern group using the third mask process.

More specifically, the passivation film 52 is entirely formed on the gate insulating film 46 provided with the data pattern by a deposition technique such as the plasma enhanced chemical vapor deposition (PECVD). The passivation film 52 is patterned by the photolithography and the etching process using the third mask to thereby form first to fifth contact holes 13, 21, 27, 33 and 39. The first contact hole 13 is formed in such a manner to pass through the passivation film 52 and exposes the drain electrode 12, whereas the second contact hole 21 is formed in such a manner to pass through the passivation film 52 and exposes the storage electrode 22. The third contact hole 27 is formed in such a manner to pass through the passivation film 52 and the gate insulating film 46 and exposes the gate pad lower electrode 26, whereas the fourth contact hole 33 is formed in such a manner to pass through the passsivation film 52 and exposes the data pad lower electrode 32, and the fifth contact hole 39 is formed in such a manner to pass through the passivation film 52 and the gate insulating film 46 and exposes the common pad lower electrode 38. Herein, when a metal which has high ratio of dry etching like a molybdenum (Mo) is used for the data metal, the first contact hole 13, the second contact hole 21 and the forth contact hole 33 are formed in such a manner to pass through to the drain electrode 12, the storage electrode 22 and the data pad lower electrode 32, respectively, to thereby expose their side.

The passivaion film 52 is made of an inorganic insulating material such as the gate insulating film 46 or an organic insulating material having a small dielectric constant such as an acrylic organic compound, BCB (benzocyclobutene) or PFCB (perfluorocyclobutane), etc.

Referring to FIG. 3D, a third conductive pattern group including the pixel electrode 14, the gate pad upper electrode 28, the data pad upper electrode 34 and the common pad upper electrode 40 is formed on the passivation film 52 using the fourth mask process.

More specifically, a transparent conductive film is coated onto the passivation film 52 by a deposition technique such as the sputtering, etc. Then, the transparent conductive film is patterned by the photolithography and the etching process using a fourth mask, to thereby provide the third conductive pattern group including the pixel electrode 14, the gate pad upper electrode 28, the data pad upper electrode 34 and the common pad upper electrode 40. The pixel electrode 14 is electrically connected, via the first contact hole 13, to the drain electrode 12 while being electrically connected, via the second contact hole 21, to the storage electrode 22. The gate pad upper electrode 28 is electrically connected, via the third contact hole 37, to the gate pad lower electrode 26. The data pad upper electrode 34 is electrically connected, via the fourth contact hole 33, to the data pad lower electrode 32. The common pad upper electrode 40 is electrically connected, via the fifth contact hole 39, to the common pad lower electrode 38.

In this connection, the transparent conductive film may be made of an indium-tin-oxide (ITO), a tin-oxide (TO), an indium-zinc-oxide (IZO) or an indium tin zinc oxide (ITZO).

As described above, the related art thin film transistor array substrate of horizontal electric field type and the manufacturing method thereof adopts a four-round mask process, thereby reducing the number of manufacturing processes in comparison to the five-round mask process and hence reducing a manufacturing cost to that extent. However, since the four-round mask process also still has a complex manufacturing process and a limit in reducing a cost, there has been required an approach that is capable of more simplifying the manufacturing process and more reducing the manufacturing cost.

SUMMARY OF THE INVENTION

Accordingly, it is an object of the present invention to provide a liquid crystal display using horizontal electric field and a method of fabricating a liquid crystal display device that are capable of reducing the number of mask processes.

In order to achieve these and other objects of the invention, the liquid crystal display of horizontal electric field applying type according to the present invention comprises: a thin film transistor array substrate, wherein the thin film transistor array substrate includes an effective display area having a gate line, a common line parallel to the gate line, a data line intersected and isolated with the gate line and the common line with a gate insulating film therebetween to define a pixel area, a thin film transistor formed on each intersection of the gate line and the data line, a passivasion film for protecting the thin film transistor, a common electrode formed in the pixel area and connected to the common line and a pixel electrode connected to the thin film transistor and formed to produce horizontal electric field along with the common electrode in the pixel area, and a pad area having a gate pad formed with at least one conductive layer included in the gate line, a data pad formed with at least one conductive layer included in the data line, a common pad formed with at least one conductive layer included in the common line, which are formed on a lower substrate to form the thin film transistor array substrate; a color filter array substrate combined with the thin film transistor array substrate as facing each other; a driving integrated circuit mounted on the substrate in order to directly connect to any one of the gate pad and the data pad; and a package mold material for capsulating the pads and the driving integrated circuit.

The passivation film is formed on the effective display area except for the pad region.

The gate insulating film is formed on the gate pad, a lower portion of the data pad, the common pad and the effective display area.

The driving integrated circuit includes a gate driving integrated circuit connected to the gate pad.

The driving integrated circuit further includes a data driving integrated circuit connected to the data pad.

The liquid crystal display of horizontal electric field applying type further comprises a plurality of signal supplying lines for supplying a driving signal to the driving integrated circuit.

The liquid crystal display of horizontal electric field applying type further comprises a connector to which a conductive film for supplying a driving signal to the signal supplying line is attached.

The liquid crystal display of horizontal electric field applying type further comprises a second package mold material for capsulating a boundary portion of the connector and the conductive film and a boundary portion of the lower substrate and the conductive film.

Each of the gate line and the common line includes a main conductive layer and a subsidiary conductive layer for providing against an opening of the main conductive layer.

Each of the gate pad and the common pad includes the main conductive layer and the subsidiary conductive layer, and wherein the subsidiary conductive layer has an exposed structure.

Each of the gate pad and the common pad includes the subsidiary conductive layer.

The main conductive layer includes at least one of an aluminum system metal, a copper, a molybdenum, a chrome and a tungsten which are a low resistance metal; and wherein the subsidiary conductive layer includes a titanium.

The data line includes a main conductive layer and a subsidiary conductive layer for providing against the opening of the main conductive layer.

The data pad includes the main conductive layer and the subsidiary conductive layer, and wherein the subsidiary conductive layer has an exposed structure.

The data pad includes the subsidiary conductive layer.

The main conductive layer includes at least one of an aluminum system metal, a copper, a molybdenum, a chrome and a tungsten which are a low resistance metal; and wherein the subsidiary conductive layer includes a titanium.

The thin film transistor comprises: a gate electrode connected to the gate line; a source electrode connected to the data line; a drain electrode facing with the source electrode; and a semiconductor layer overlapped with the gate electrode with the gate insulating film therebetween to form a channel portion between the source electrode and the drain electrode.

The drain electrode and the pixel electrode are made of an identical conductive layer.

The semiconductor layer is formed on the gate insulating film along the data line, the source electrode, the drain electrode and the pixel electrode.

In order to achieve these and other objects of the invention, a method for fabricating a liquid crystal display of horizontal electric field applying type includes: preparing a thin film transistor array substrate having an effective display area and a pad area formed on a lower substrate, wherein the effective display area includes a gate line, a common line parallel to the gate line, a data line intersected with the gate line and the common line with a gate insulating film therebetween to define a pixel area, a thin film transistor formed on each intersection of the gate line and the data line, a passivasion for protecting the thin film transistor, a common electrode formed in the pixel area and connected to the common line and a pixel electrode connected to the thin film transistor and formed to produce horizontal electric field along with the common electrode in the pixel area, and the pad area includes a gate pad formed with at least one conductive layer included in the gate line, a data pad formed with at least one conductive layer included in the data line, a common pad formed with at least one conductive layer included in the common line; preparing a color filter array substrate combined with the thin film transistor array substrate as facing each other; combining the thin film transistor array substrate and the color filter array substrate to expose the pad region; exposing the common pad, the gate pad and the data pad; mounting a driving integrated circuit on the substrate in order to directly connect to any one of the gate pad and the data pad; and capsulating a pad connected with the driving integrated circuit with a package mold material.

The step of mounting the driving integrated circuit includes connecting the gate pad and the gate driving integrated circuit.

The step of mounting the driving integrated circuit further includes connecting the data pad and data driving integrated circuit.

The method according to claim 20, further comprising the step of forming a plurality of signal supplying lines for supplying a driving signal to the driving integrated circuit.

The method for fabricating a liquid crystal display of horizontal electric field applying type further comprises the step of attaching a connector connected to the signal supplying lines with a conductive film for supplying a driving signal to the signal supplying lines.

The method for fabricating a liquid crystal display of horizontal electric field applying type further comprises the step of capsulating a boundary portion of the connector and the conductive film and a boundary portion of the lower substrate and the conductive film a second package mold material.

The step of preparing a thin film transistor array substrate includes: forming, on the lower substrate, a first conductive pattern group including the gate line, a gate electrode connected to the gate line, the common line parallel to the gate line, the common electrode, the gate pad and the common pad; forming a gate insulating film on the substrate having the first conductive pattern group thereon; forming a semiconductor layer at a predetermined area on the gate insulating film and a second conductive pattern group having the date line, a source electrode of the thin film transistor connected with the data line, a drain electrode of the thin film transistor being opposite to the source electrode, a pixel electrode connected with the drain electrode and paralleled to the common electrode and the data pad; and forming a passivation film for covering the second conductive pattern group.

The step of exposing the gate pad and the data pad includes etching the gate insulating film and the passivaion film using the color filter array substrate as the mask.

At least one of the first and the second conductive pattern group is formed to have a double-layer structure having a main conductive layer and a subsidiary conductive layer for providing against the opening of the main conductive layer.

The step of exposing the gate pad and the data pad includes exposing the subsidiary conductive layers of the gate pad and the common pad and the subsidiary conductive layer of the data pad.

The main conductive layer includes at least one of an aluminum system metal, a copper, a molybdenum, a chrome and a tungsten which are a low resistance metal, and wherein the subsidiary conductive layer includes a titanium.

BRIEF DESCRIPTION OF THE DRAWINGS

These and other objects of the invention will be apparent from the following detailed description of the embodiments of the present invention with reference to the accompanying drawings, in which:

FIG. 7A and FIG. 7B are a plan view and a sectional view for explaining a first mask process among a manufacturing method of a thin film transistor array substrate according to the embodiment of the present invention, respectively;

FIGS. 8A to 8C are sectional views for concretely explaining the first mask process among the manufacturing method of the thin film transistor array substrate according to the embodiment of the present invention;

FIGS. 10A to 10F are sectional views for concretely explaining the second mask process among the manufacturing method of the thin film transistor array substrate according to the embodiment of the present invention;

FIGS. 11A and 11B are a plan view and a sectional view for explaining a pad opening process according to the embodiment of the present invention, respectively;

FIG. 13 is a sectional view showing pads of a first structure in the thin film transistor substrate according to the embodiment of the present invention;

FIGS. 17A and 17B are a plan view and a sectional view for representing a flexible printed circuit supplying a driving signal to the drive IC formed at pad region of the thin film transistor array substrate according to the embodiment of the present invention in detail.

DETAILED DESCRIPTION OF THE PREFERRED EMBODIMENT

Hereinafter, the preferred embodiments of the present invention will be described in detail with reference to FIGS. 4 to 18B.

Figure 1:
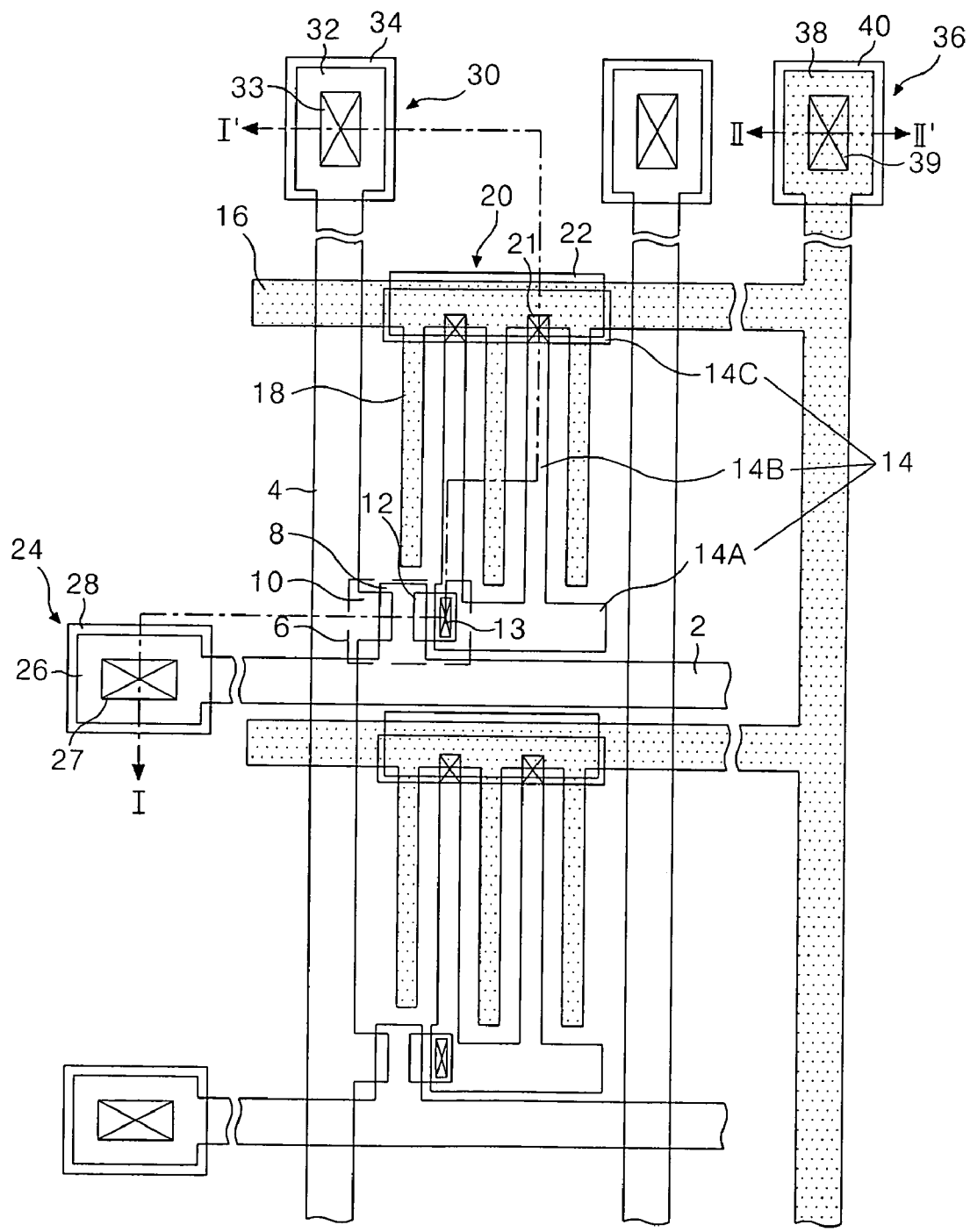
FIG. 1 is a plan view showing the related art thin film transistor array substrate of liquid crystal display of horizontal electric applying type.
Figure 2:
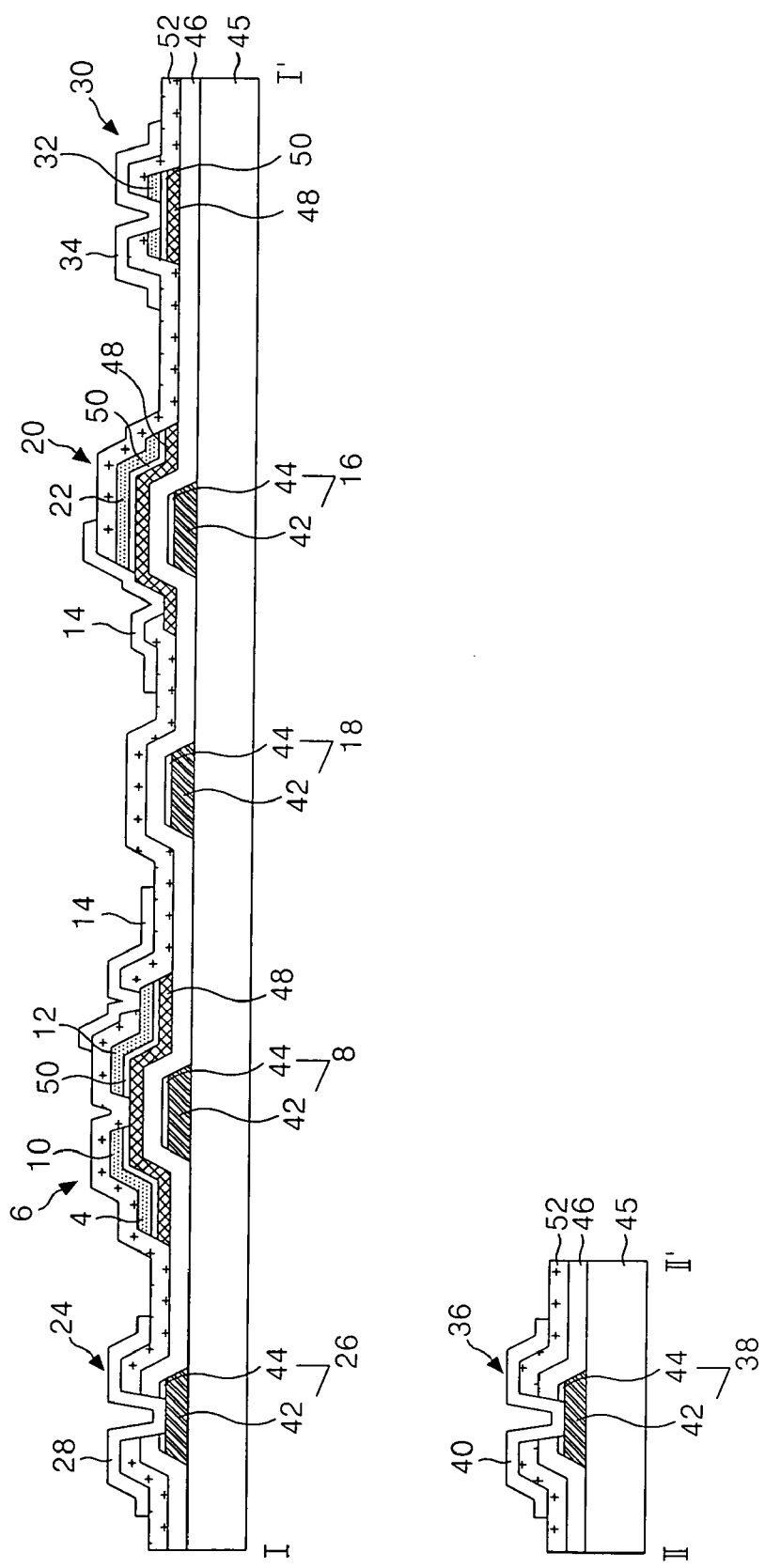
FIG. 2 is a sectional view of the thin film transistor array substrate taken along the lines I–I' and II–II' in FIG. 1.
Figure 3A:
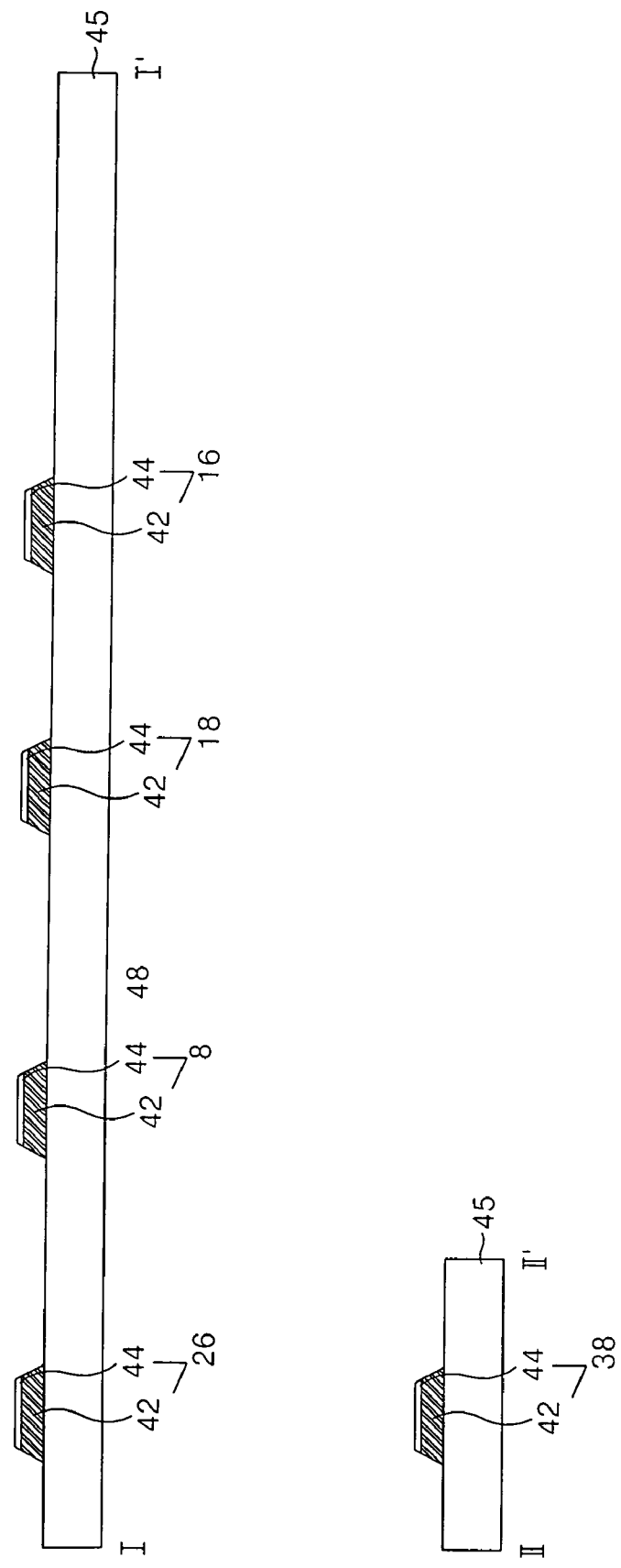
FIGS. 3A to 3D are sectional sequentially views illustrating a method of manufacturing the thin film transistor array substrate shown in FIG. 2.
Figure 3B:
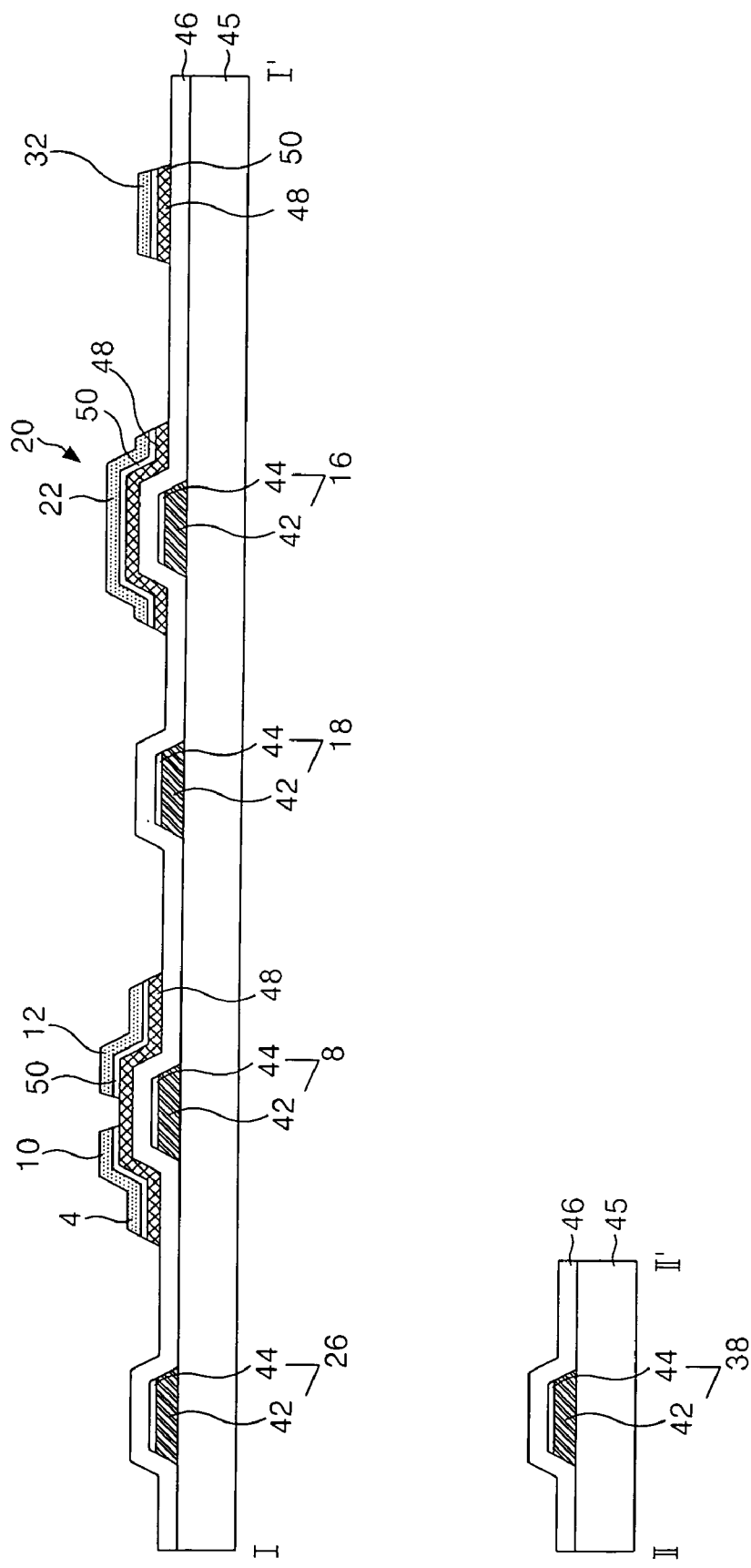
Figure 3C:
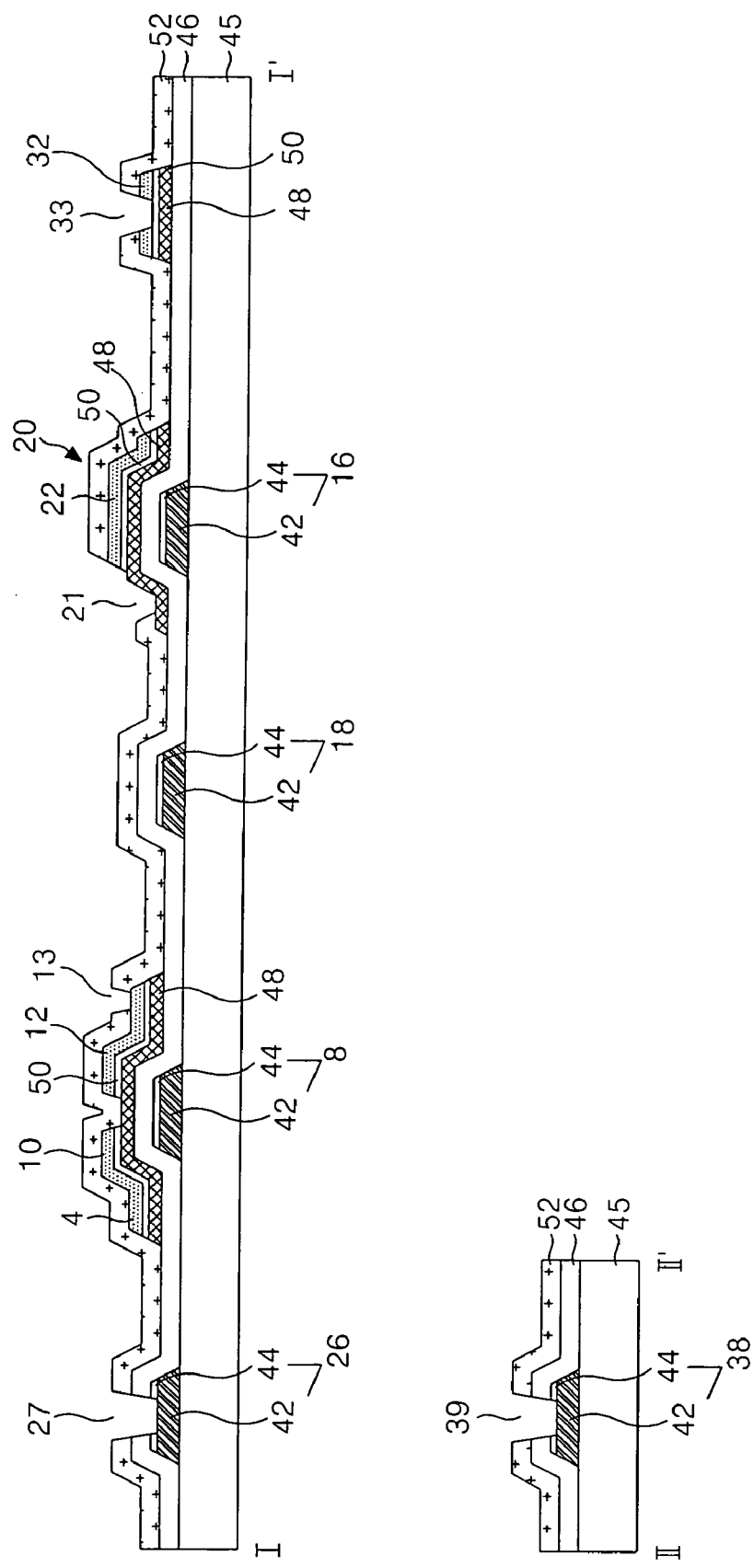
Figure 3D:
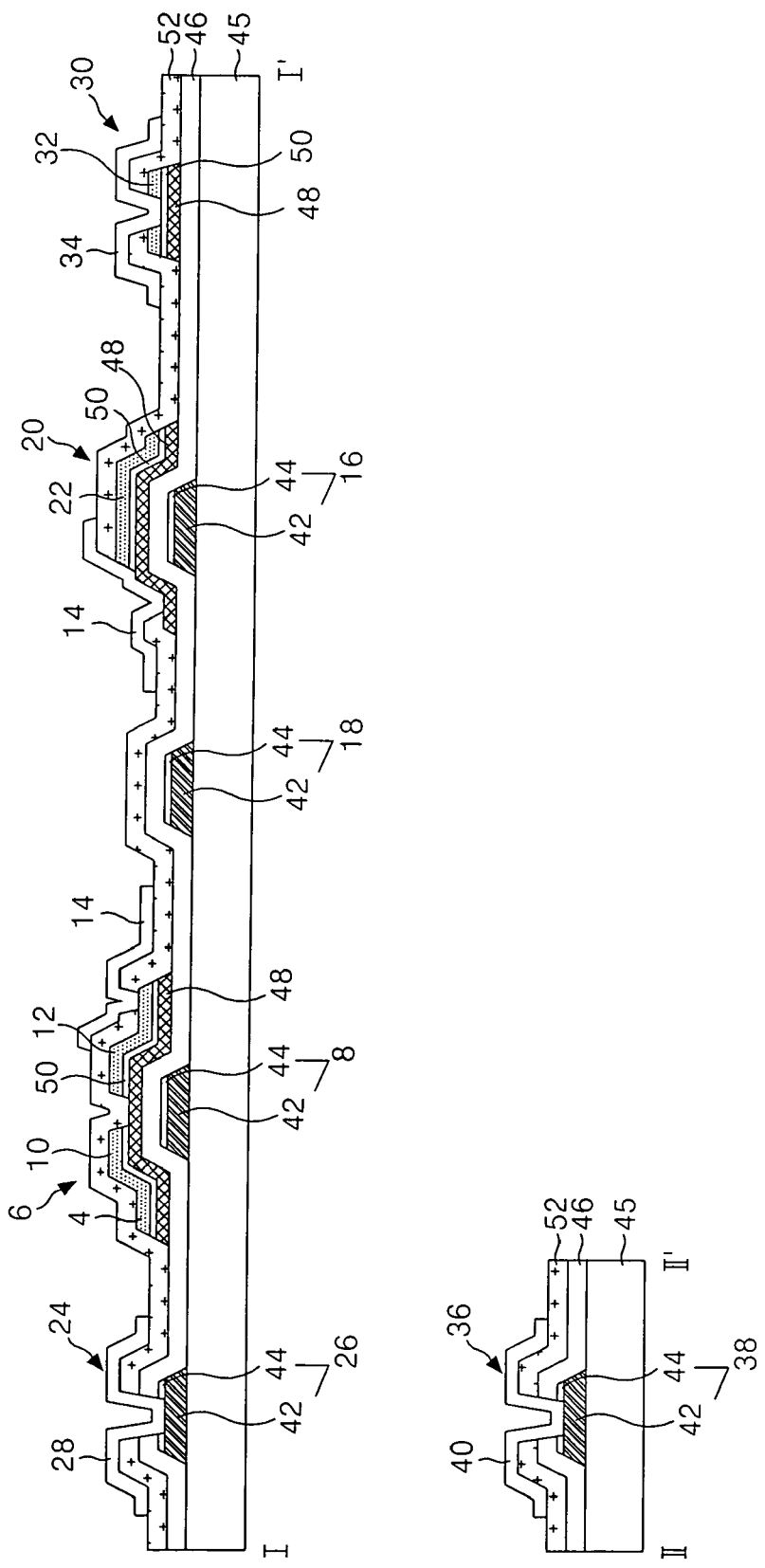
Figure 4:
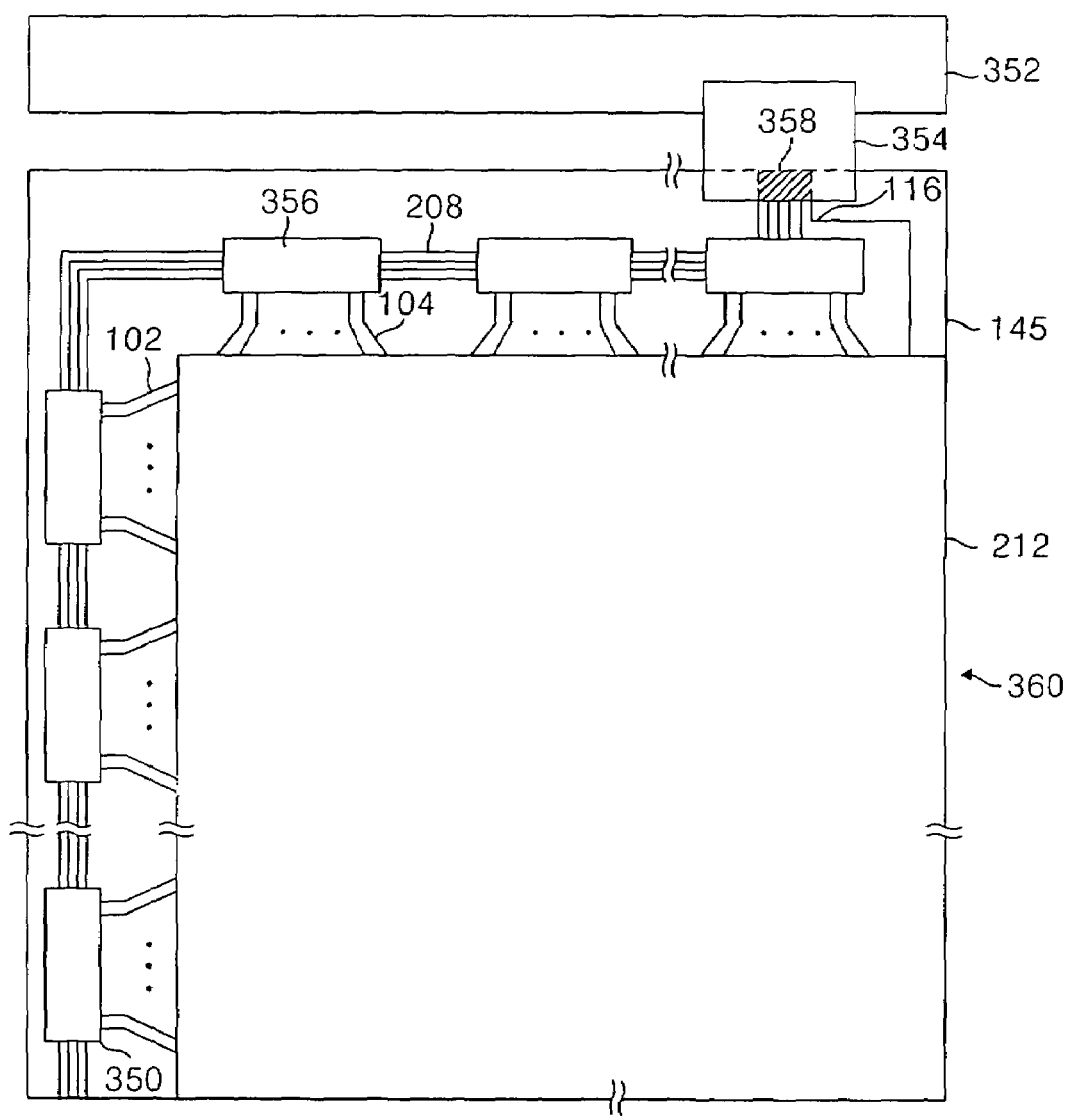
FIG. 4 is a plan view showing a liquid crystal display of horizontal electric field applying type according to an embodiment of the present invention.

FIG. 4 is a plan view representing a liquid crystal display of horizontal electric field applying type according to the present invention.

Referring to FIG. 4, a liquid crystal display of horizontal electric field applying type according to the present invention comprises a gate drive integrated circuit (IC) 350 and a data drive IC 354 formed on a liquid crystal panel, and a flexible printed circuit (FPC) 354 supplying a driving signal to drive ICs 350 and 356.

The data drive ICs 356 are mounted by a chip on glass (COG) system on the lower substrate 145 and are connected to data lines 104 via the data pad. Therefore, the data drive ICs 356 supply data signals to the data lines 104.

For the sake of it, data control signals and data signals from a timing controller and a power source portion (not shown) on a PCB (Printed Circuit Board) 352 are supplied to a signal supplying line 208 via the FPC 354 and a COG connector 358. A signal supplying line 208 is connected to an input terminal of each of the data drive ICs 356 through an input bump to thereby supply the data control signals and the data signals to the data drive IC 356. The data drive IC 356 generates data driving signals using the data control signals and the data signals. The data driving signals are supplied to the data pad 130 through an output bump 286 connected to output terminals 284 of the data drive IC 356.

The gate drive ICs 350 are mounted by a COG system on the lower substrate 145 and are connected to gate lines 102 via the gate pad 124. The gate drive ICs 350 supplies a gate signal to the gate line 102.

To this end, gate control signals and power source signals from a timing controller and a power source (not shown) on PCB (Printed Circuit Board) 352 are supplied to the signal supplying line 208 via the FPC 354 and the COG connector 358. The signal supplying line 208 is connected to an input terminal of each of the gate drive ICs 350 through an input bump to thereby supply the gate control signals and the power source signals to the gate drive IC 350. The gate drive IC 350 generates a gate-driving signal using the gate control signals and the power source signals. The gate driving signals are supplied to the gate pad 124 through an output bump 260 connected to output terminals 262 of the gate drive IC 350.

The FPC 354 supplies control signals and power source signals from a timing controller and a power source (not shown) on the PCB 352 to the gate drive IC 350 and the data drive IC 356 corresponding thereto. That is, an input pad of the FPC 354 is connected to the PCB 352 and an output pad of the FPC 354 is connected to the COG connector 358. Further, any one of output pads 282 of the FPC 354 is connected to the common pad 130 using the ACF 182 including the conductive ball 184 as shown in FIGS. 5 and 6.

Figure 6:
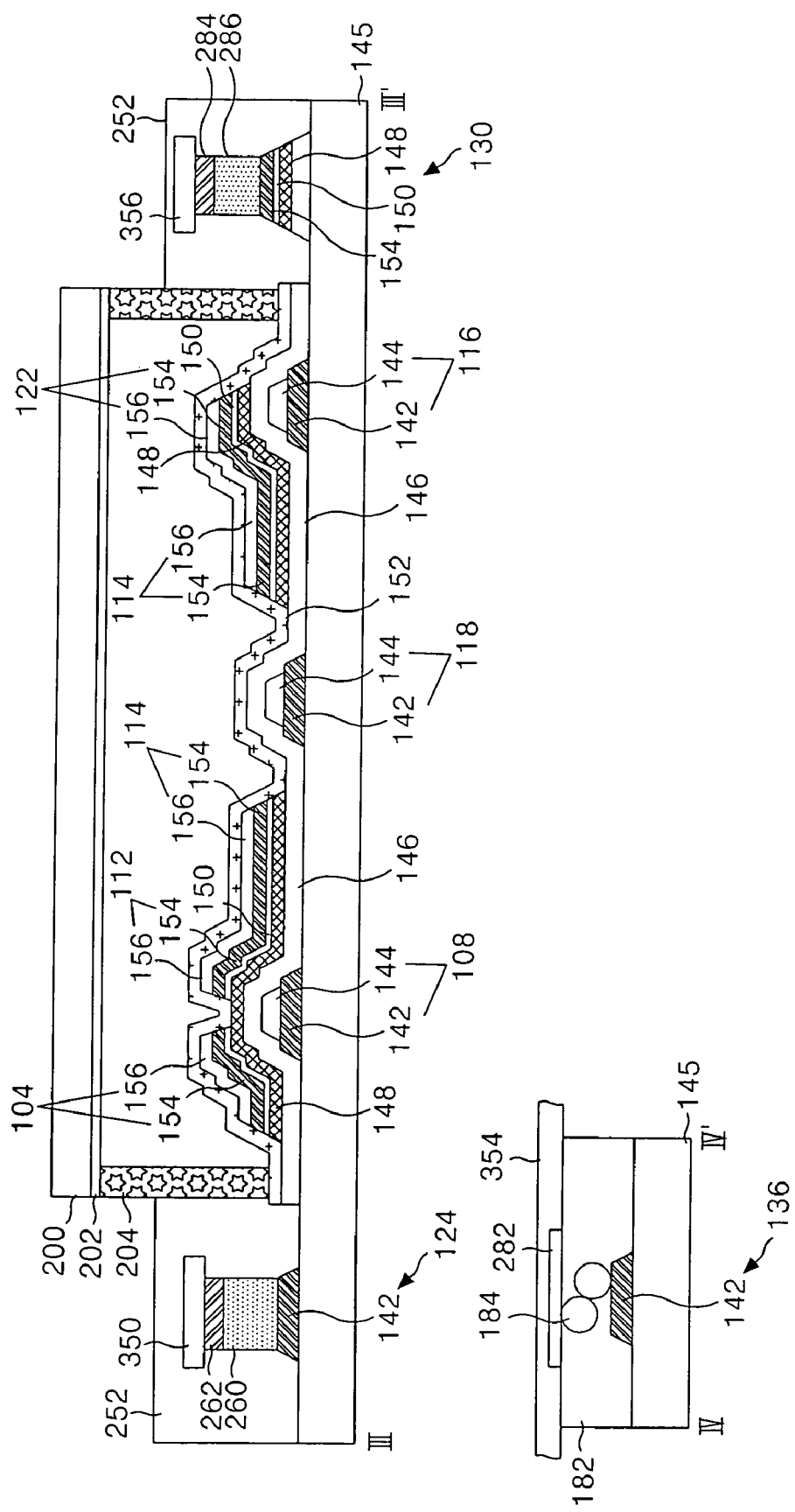
FIG. 6 is a sectional view of the liquid crystal display panel taken along the lines III–III' and IV–IV' in FIG. 4.

On the hand, the signal supplying 208, the pads, gate drive IC 350 and the data drive IC 356 connected on the lower substrate 145 are protected by a package mold material 252 as shown in FIG. 6. Further, the package mold material 252 is formed to capsulate a boundary portion of the FPC 354 and the COG connector 358 which are connected each other. The package mold material 252 is made of, for example, a sealing resin.

Figure 5:
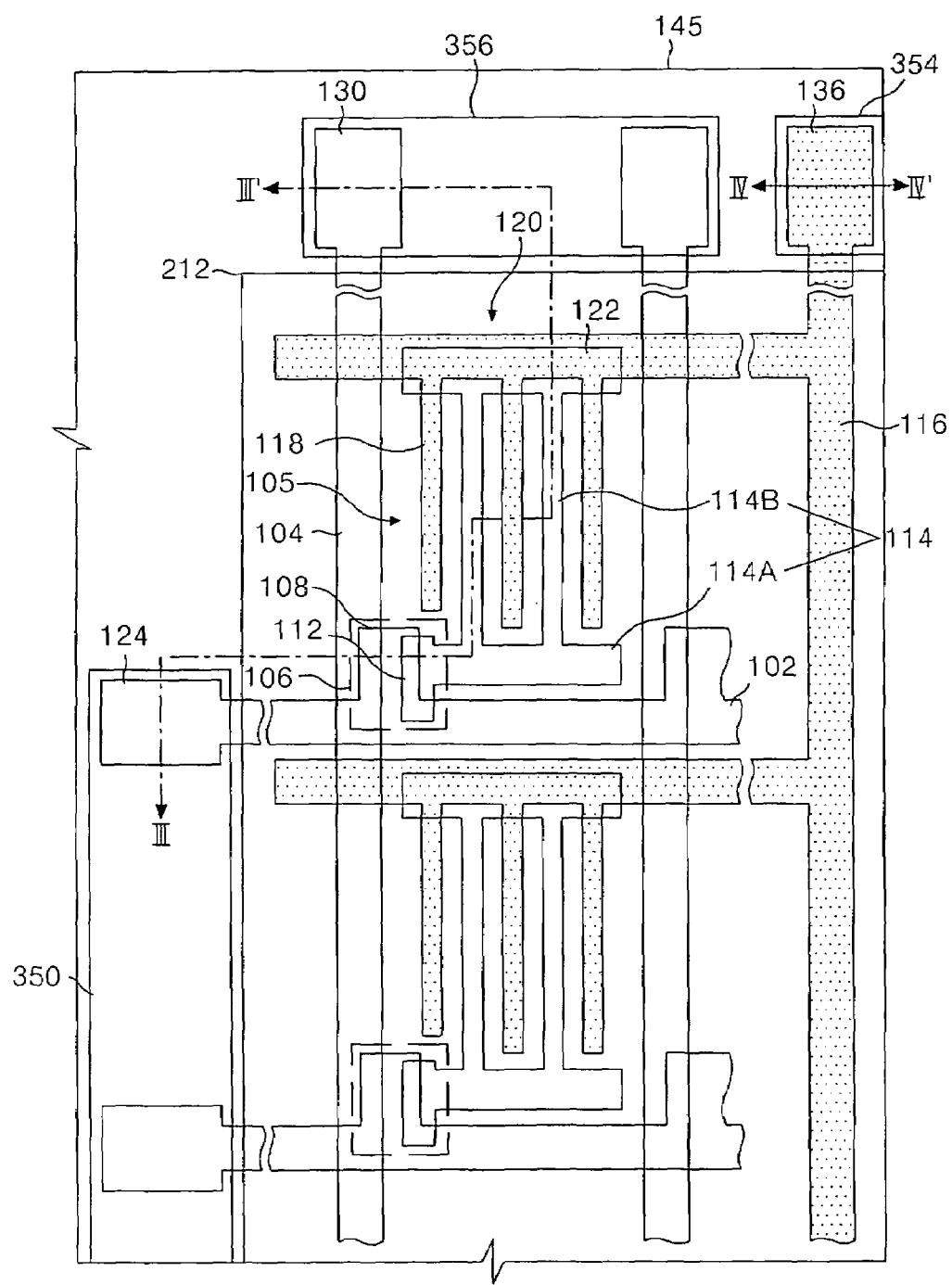
FIG. 5 is a plan view showing the liquid crystal display panel shown in FIG. 4.

As shown in FIGS. 5 and 6, a liquid crystal panel 360 is fabricated by combining, using a sealant 204, a thin film transistor array substrate in which a thin film transistor array is formed on the lower substrate 145 and a color filter array substrate in which a color filter array 202 is formed on an upper substrate 200.

The thin film transistor array substrate comprises a gate line 102 and a data line 104, which have a gate insulating film 146 therebetween, formed on a lower substrate 145 in such a manner to intersect each other, a thin film transistor 106 formed at each intersection of the gate line 102 and the data line 104, a pixel electrode 114 and a common electrode 118 formed in order to apply the horizontal electric field in a pixel region defined by the interconnection and a common line 116 connected to the common electrode 118. Moreover, the thin film transistor array substrate further comprises a storage capacitor 120 formed at an overlapped portion between a storage electrode 122 and the common line 116, a gate pad 124 extended from the gate line 102, and a data pad 130 extended form data line 104 and a common pad 136 extended from the common line 116.

The gate line 102 for supplying a gate signal and the data line 104 for supplying a data signal are formed in an intersection structure to thereby define a pixel region 105.

The common line 116 supplying a reference voltage used to drive the liquid crystal is formed in parallel with the gate line 102 with the pixel region 105 positioned between the common line 116 and the gate line 102.

The thin film transistor 106 responds to the gate signal of the gate line 102 so that the pixel signal of the data line 104 is charged and maintained in the pixel electrode 114. To this end, the thin film transistor 106 comprises a gate electrode 108 connected to the gate line 102, a source electrode included in the data line 104 and a drain electrode 112 connected to the pixel electrode 114. In addition, the thin film transistor 106 further includes an active layer 148 overlapping with the gate electrode 108 with a gate insulating film 146 positioned therebetween and defining a channel between the source electrode and the drain electrode 112.

The active layer 148 is formed to overlap with the data line 104, the data pad 130 and the storage electrode 122. On the active layer 148, an ohmic contact layer 150 for making an ohmic contact with the data line 104, the drain electrode 112, the data pad 130 and the storage electrode 122 is further provided.

The pixel electrode 114 being integral to the drain electrode 112 of the thin film transistor 106 and the storage electrode 122 is formed in the pixel region 105. Particularly, the pixel electrode 114 comprises a horizontal part 114A extended in parallel with adjacent gate line 102 from the drain electrode 112 and a finger part 114B extended from the horizontal part 114A in vertical direction.

The common electrode 118 is connected to the common line 116 and is formed in the pixel region 105. Specially, the common electrode 118 is formed in parallel with the finger part 114B of the pixel electrode 114 in the pixel region 105.

Accordingly, a horizontal electric field is formed between the pixel electrode 114 to which the pixel signal is supplied via the thin film transistor 106 and the common electrode 118 to which the reference voltage is supplied via the common line 116. In practically, the horizontal electric field is formed between the finger part 14B of the pixel electrode 114 and the common electrode 118. The liquid crystal molecules arranged in the horizontal direction between the thin film transistor array substrate and the color filter array substrate by the horizontal electric field becomes to rotate due to a dielectric anisotropy. Further, the light transmittance transmitting the pixel region 105 differs in accordance with a rotation amount of the liquid crystal molecules and thereby the pictures can be represented.

The storage capacitor 120 is comprised of the common line 116 and the storage electrode 122 overlapping with the common line 116, wherein the storage electrode 122 has the gate insulating film 146, the active layer 148 and the ohmic contact layer 150 between the storage capacitor 120 and the common line 116, and being integral with the pixel electrode 114. The storage capacitor 120 allows a pixel signal charged in the pixel electrode 114 to be maintained stably until the next pixel signal is charged.

The gate line 102 is connected, via the gate pad 124, to a gate driver IC 350 mounted on the lower substrate. The gate pad 124 is extended from the gate line 102 to thereby form structure in which a titanium Ti included to the gate line 102 is exposed. The gate drive IC 350 and the gate pad 124 are packaged for the protection thereof by the package mold material 252.

The common line 116 is connected to the FPC 354 for supplying the reference voltage from the power source of exterior (not shown) via the common pad 136. The common pad 136 is extended from the common line 116 and has structure in which a titanium (Ti) included in the common line 116 is exposed.

More specifically, the gate line 102, the gate electrode 108, the common line 116 and common electrode 118 have a double-layer structure of metal layers of a first and a second metal layers 142 and 144 as stacked. Any one of the metal layers is made of any metal that has a relatively high strength and corrosion resistance such as a titanium (Ti) and a tungsten (W). Whereas, another metal layer is made of a low resistance metal such as an aluminum (Al) system metal, a molybdenum (Mo) and a copper (Cu) that are conventionally employed as a gate metal.

In this connection, in case where the first metal layer 142 is made of any metal that has a high strength and corrosion resistance, the gate pad 124 and the common pad 138 have structure in which the second metal layer 144 of an upper portion is removed and the first metal layer 142 of the lower portion is exposed. On the other hand, in case where the second metal layer 144 is made of any metal that has a high strength and corrosion resistance, the gate pad 124 and the common pad 138 have structure in which the second metal layer 144 of an upper portion is exposed.

The data line 104 is connected to the data driver IC 356 via the data pad 130. The data pad 130 is extended from the data line 104 to thereby get structure in which a titanium Ti and a tungsten (W) included to the data line are exposed. The data drive IC 356 and the data pad 130 are packaged for protection thereof by the package mold material 252.

In particular, the data line 104, the drain electrode 112, the pixel electrode 114 and the storage electrode 122 have a double-layer structure of metal layers stacked with a first and a second metal layers 154 and 156. One metal layer of the metal layers is made of any metal that has a relatively high strength and corrosion resistance such as a titanium (Ti) and a tungsten (W). Whereas, another metal layer is made of a low resistance metal such as an aluminum (Al) system metal, a molybdenum (Mo) and a copper (Cu) that are generally employed as a gate metal.

In this connection, in case where the first metal layer 154 is made of any metal having a high strength and corrosion resistance, the data pad 130 has structure in which the second metal layer 156 of an upper portion is removed and the first metal layer 154 of a lower portion is exposed. On the other hand, in case where the second metal layer 156 is made of any metal having a high strength and corrosion resistance, the data pad 130 has structure in which the second metal layer 156 of an upper portion is exposed.

Figure 7A:
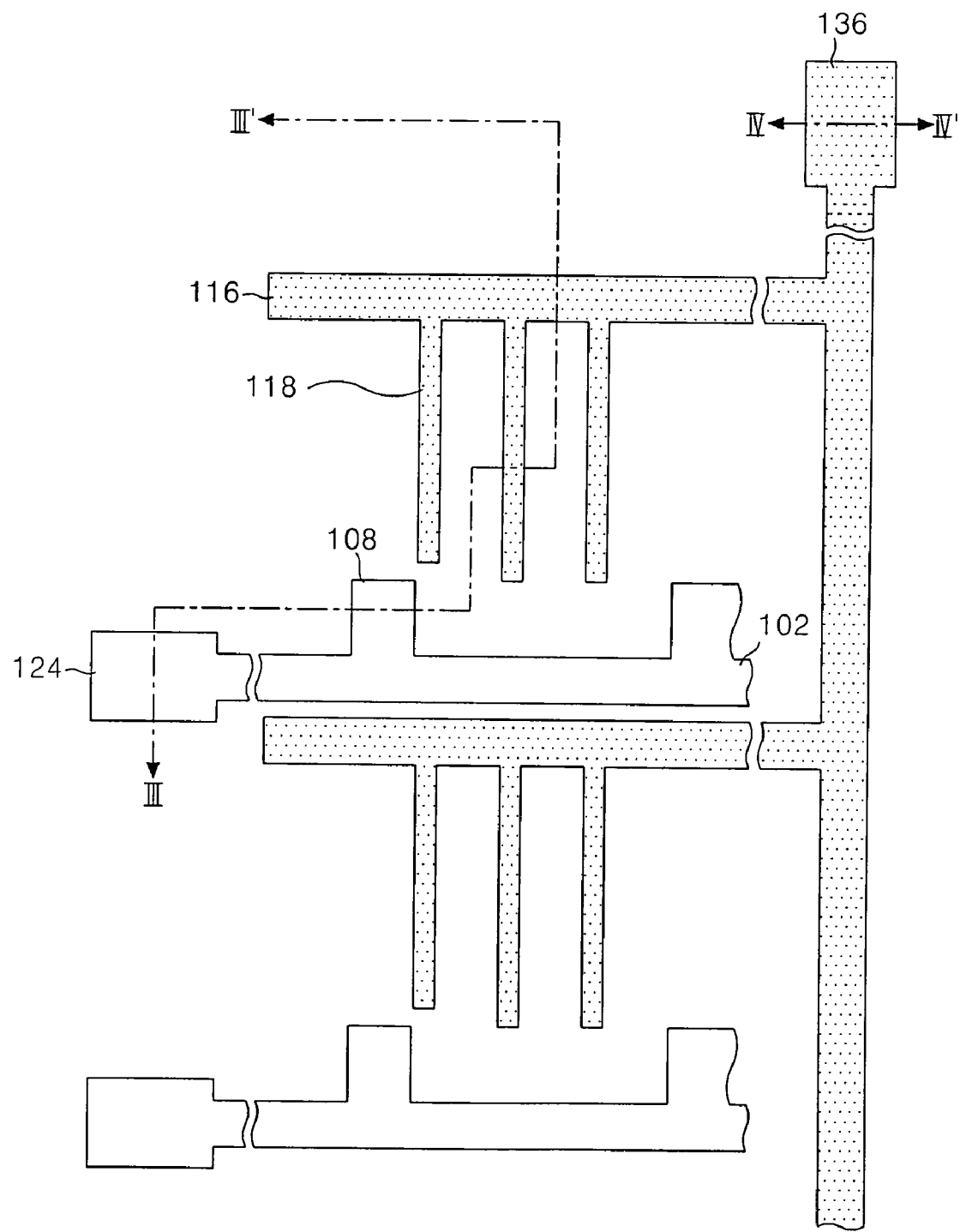

FIGS. 7A and 7B are a plan view and a sectional view for explaining a first mask process employed in a manufacturing method of the thin film transistor array substrate of horizontal electric applying type shown in FIGS. 4 and 5, respectively.

As shown in FIGS. 7A and 7B, a first conductive pattern group including the gate line 102, the gate electrode 108 and the gate pad 124, the common line 116, the common electrode 118 and the common pad 136 is formed on the lower substrate 145 using the first mask process.

There will be explained the first mask process in detail with reference to FIGS. 8A to 8C.

As shown in FIG. 8A a first gate metal layer 142 and a second gate metal layer 144 are sequentially formed on the upper substrate 145 by a deposition method such as a sputtering, to thereby form a gate metal layer of double-layer structure. Herein, any one of the first gate metal layer 142 and the second gate metal layer 144 is made of any metal that has a relatively high strength and corrosion resistance such as a titanium (Ti) and a tungsten (W), whereas another metal layer is made of a metal such as an aluminum (Al) system metal, a molybdenum (Mo) and a copper (Cu). Subsequently, a photo-resist film is entirely formed on the second gate metal layer 144 and then a first mask 300 is arranged on the lower substrate 145 as shown in FIG. 8B. The first mask 300 comprises a mask substrate 304 which is a transparent material and a cut-off part formed on a cut-off region P2 of the mask substrate 304. Herein, region in which the mask substrate 304 is exposed becomes an exposure region P1. The photo-resist film is exposed using the first mask 300 as set forth above and developed, to thereby form the photo-resist pattern 306 in the cut-off region P2 corresponding to the cut-off part 302 of the first mask 300. The first and the second gate metal layer 142 and 144 are patterned by an etching process using the photo-resist pattern 306, to thereby form the first conductive pattern group including the gate line, the gate electrode 108, the gate pad 124, the common line 116, the common electrode 118 and the common pad 136 as shown in FIG. 8C.

Figure 9A:
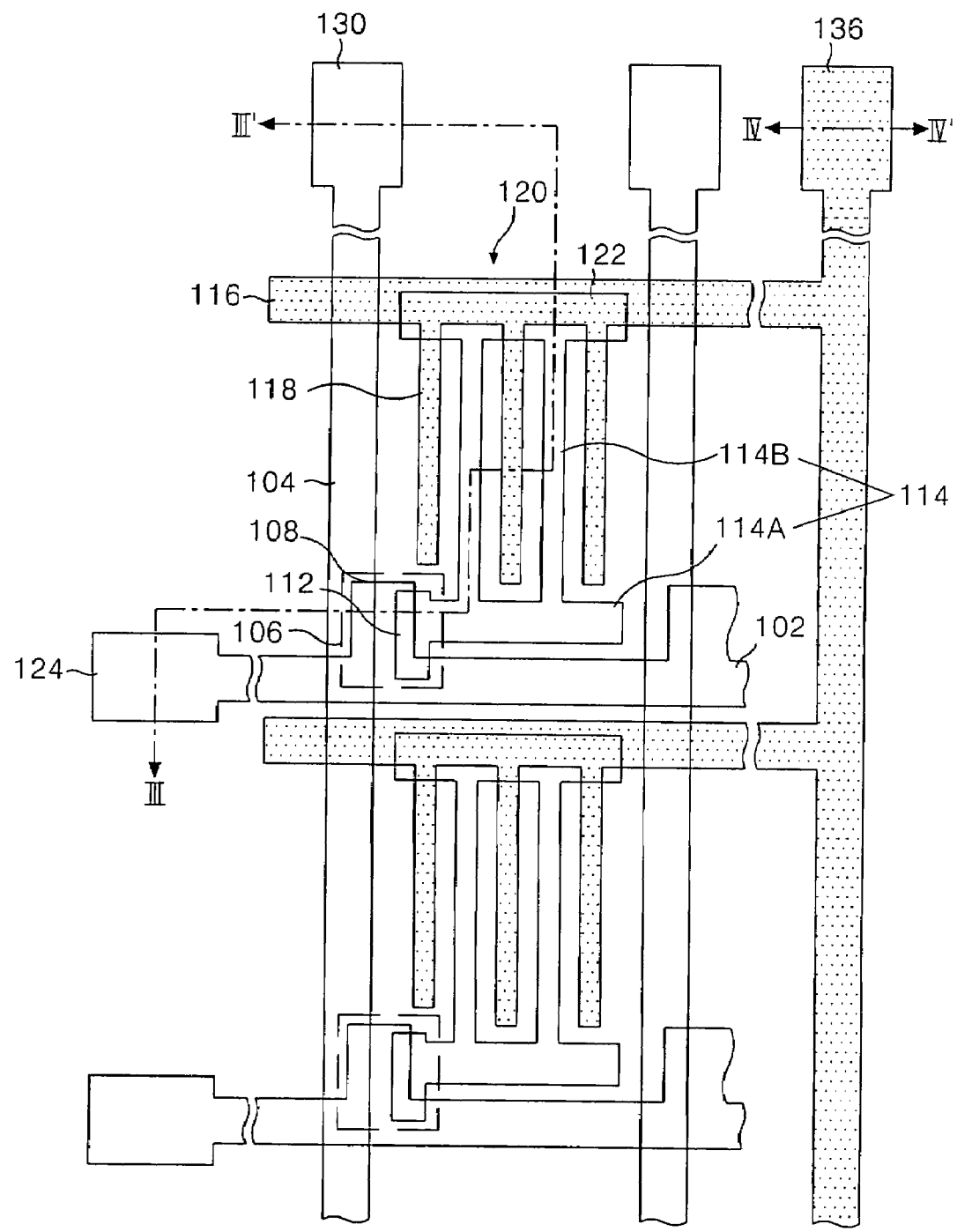
FIGS. 9A and 9B are a plan view and a sectional view for explaining a second mask process among the manufacturing method of a thin film transistor array substrate according to the embodiment of the present invention, respectively.
Figure 9B:
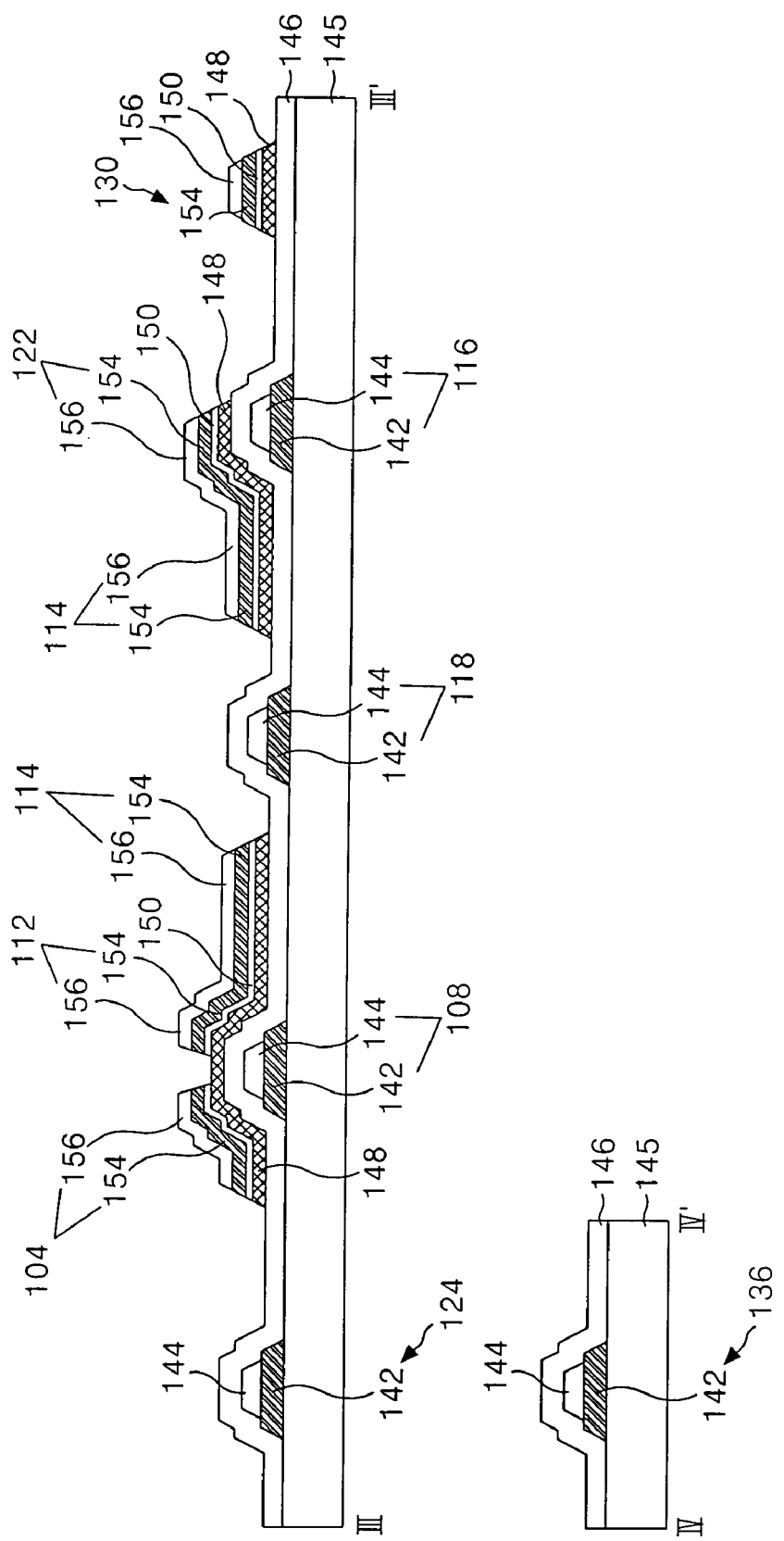

FIGS. 9A and 9B are a plan view and a sectional view for explaining a second mask process employed in the manufacturing method of the thin film transistor array substrate of horizontal electric applying type according to the embodiment of the present invention, respectively.

At first, a gate insulating film 146 is formed on the lower substrate 145 provided with the first conductive pattern group by deposition method such as the plasma enhanced chemical vapor deposition (PECVD) or sputtering. The gate insulating film 146 is made of an inorganic insulating material such as silicon oxide ($SiO_x$) or silicon nitride ($SiN_x$).

Further, as shown in FIGS. 9A and 9B, a semiconductor pattern group including an active layer 148 and the ohmic contact layer 150, and a second conductive pattern group including the data line 104, the drain electrode 112, the pixel electrode 114, the data pad 130 and the storage electrode 122 are formed on the gate insulating film 146 using the second mask process.

There will be explained the second mask process in detail with reference to FIGS. 10A to 10F.

Figure 10A:
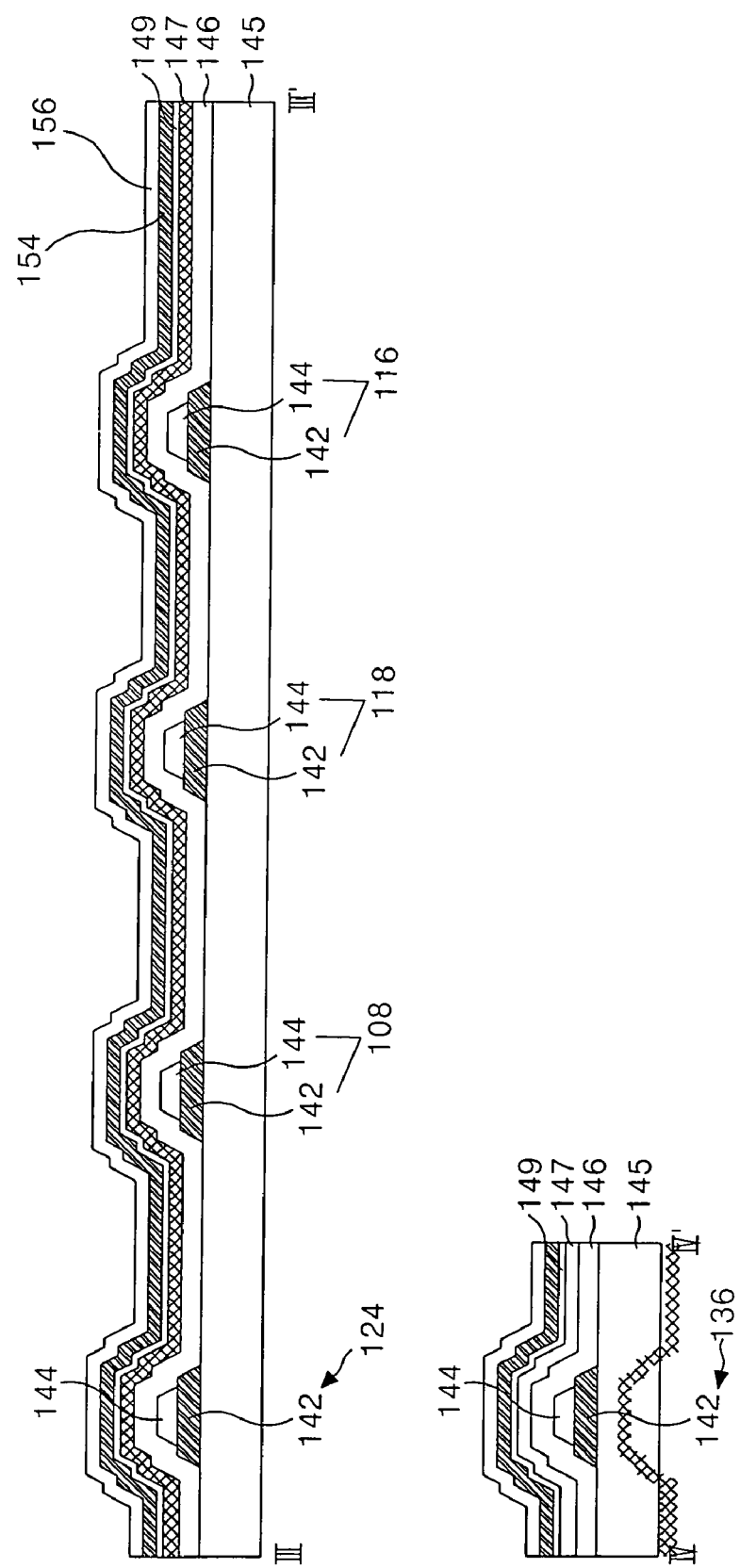

As shown in FIG. 10A, on the gate insulating film 146, a first semiconductor layer 147, a second semiconductor layer 149, a first and a second source/drain metal layer 154 and 156 are sequentially provided by deposition techniques such as the plasma enhanced chemical vapor deposition (PECVD) and the sputtering, etc. Herein, the first semiconductor layer 147 is made of an amorphous silicon that an impurity is not doped and the second conductor layer 149 is made of amorphous silicon that an impurity of a N type or P type is doped. Any one of the first and the second source/drain metal layers 154 and 156 is made of any metal that has a relatively high strength and corrosion resistance such as a titanium (Ti) and a tungsten (W), whereas another metal layer is made of any metal such as an aluminum (Al) system metal, a molybdenum (Mo) and a copper (Cu).

Figure 10B:
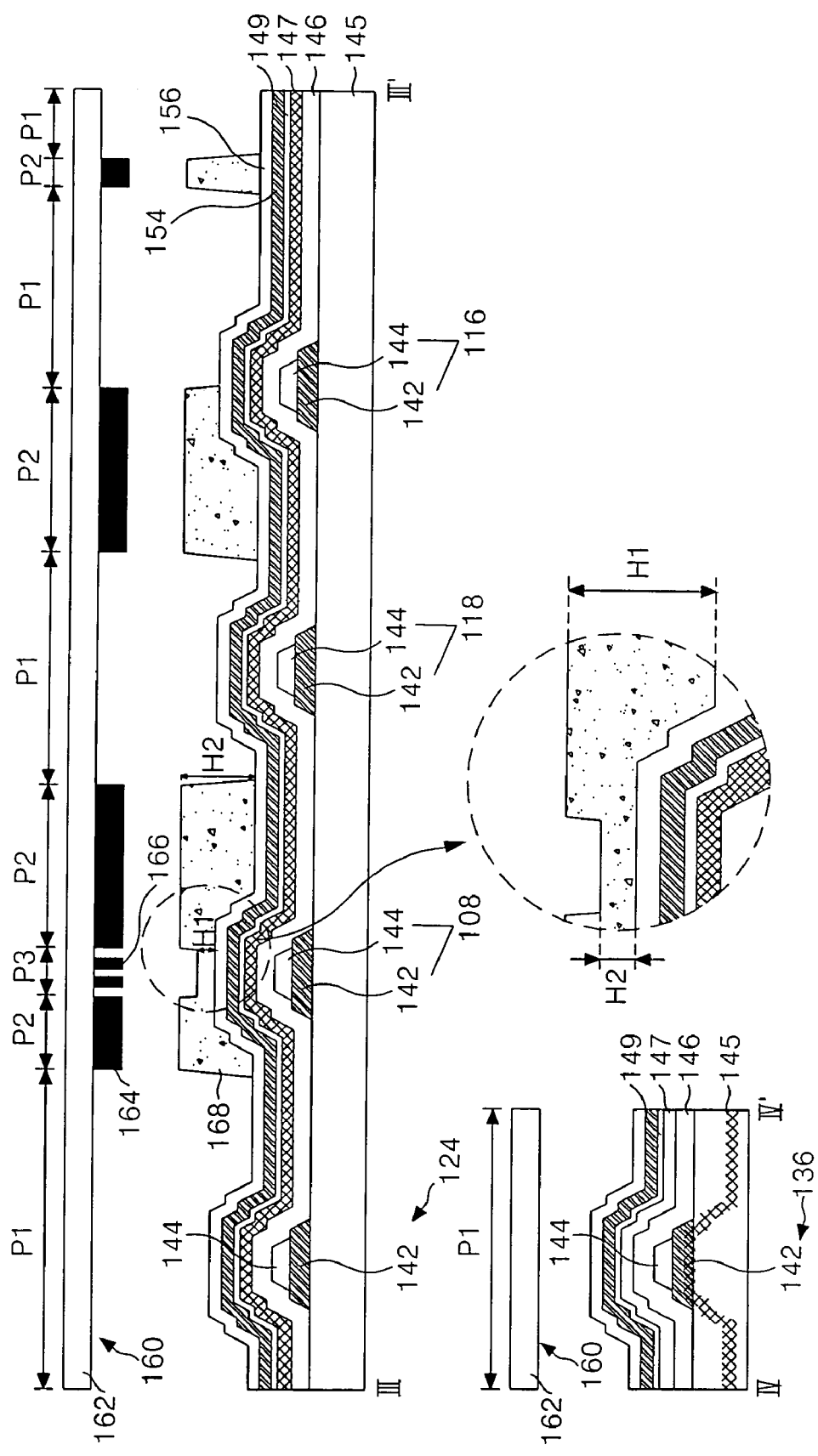

Thereafter, a photo-resist film is formed on the second source/drain metal layer 156 and then a second mask 160 used for a partial exposure is arranged on the lower substrate 145 as shown in FIG. 10B. The second mask 160 comprises a mask substrate 162 which is of a transparent material, a cut-off part 164 formed on a cut-off region P2 of the mask substrate 162 and a diffractive exposure part 166 (or a semi-transmitting part) formed on a partial exposure region P3 of the mask substrate 162. Herein, a region in which the mask substrate 162 is exposed becomes an exposure region P1. The photo-resist film is exposed using the second mask 160 as set forth above and then developed, to thereby form the photo-resist pattern 168 which has a stepped part in the cut-off region P2 and the partial exposure region P3 corresponding to the diffractive exposure part 166 and cut-off part 164 of the second mask 160. That is, the photo-resist pattern 168 formed in the partial exposure region P3 has a second height H2 that is lower than a first height H1 of the photo-resist pattern 168 formed in the cut-off region P2.

Subsequently, the first and the second source/drain metal layer 154 and 156 are patterned by a wet etching process using, as a mask, the photo-resist pattern 168, so that the second conductive pattern group including the data line 104, the drain electrode 112 connected to the data line 104, the pixel data 114, the storage electrode 122 and the data pad 130 is formed as shown in FIG. 10C.

Figure 10D:
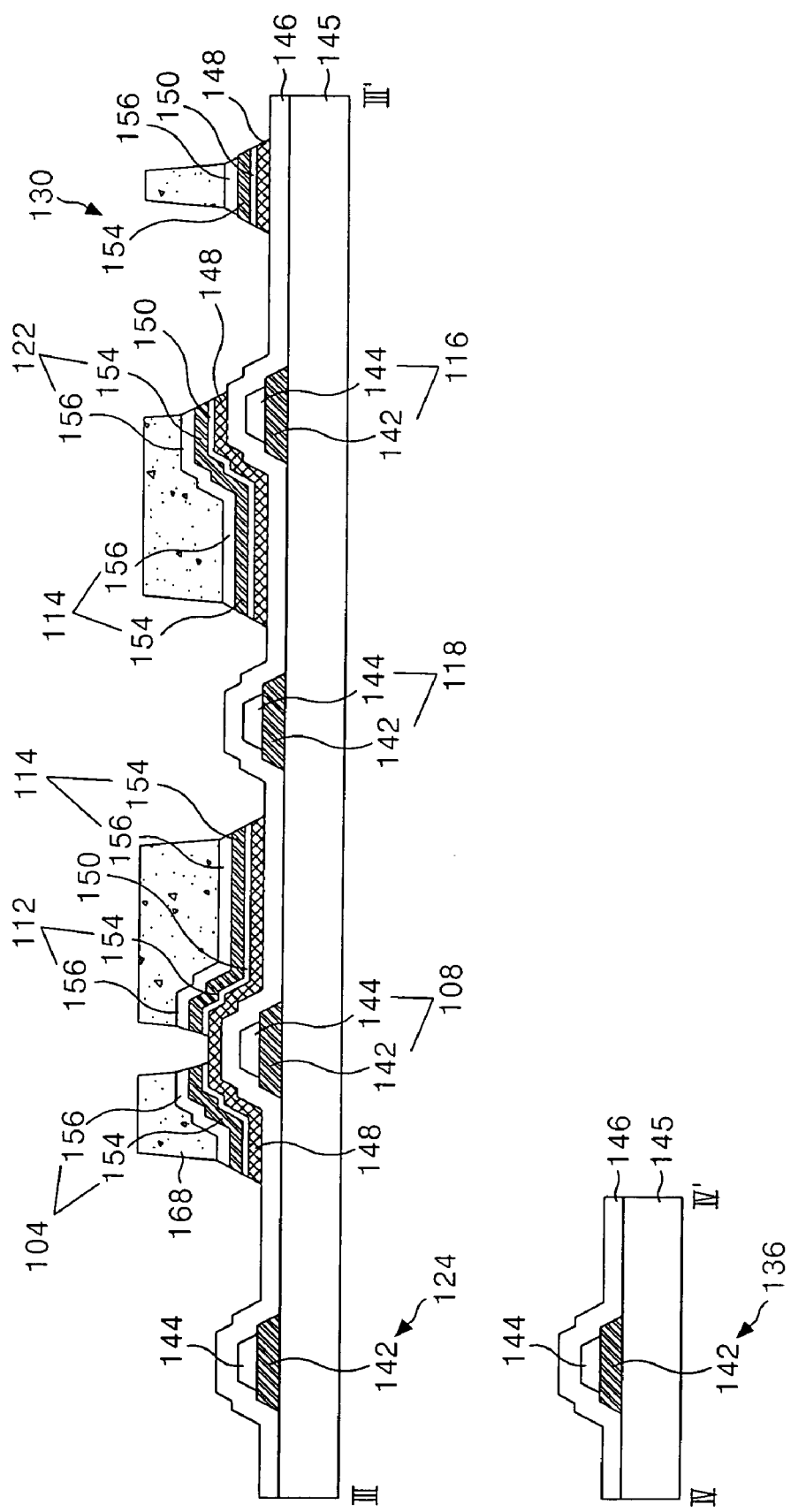

Thereafter, the first semiconductor layer 147 and the second semiconductor layer 149 are patterned by a dry etching process using the photo-resist pattern 168 as a mask to thereby provide the ohmic contact layer 150 and the active layer 148 along the second conductive pattern group as shown in FIG. 10D. Next, the photo-resist pattern 168 formed with the second height H2 in the partial exposure region P3 is removed by the ashing process using an oxygen ($O_2$) plasma, whereby the photo-resist pattern 168 formed with the first height H1 in the cut-off region P2 has a lowered height. The partial exposure region P3, that is, the first and the second source/drain metal layers 154 and 156 formed at channel portion of the thin film transistor are removed by etching process using the photo-resist pattern 168. For instance, in case where the second source/drain metal layer 156 is made of a molybdenum Mo and the first source/drain metal layer 154 is made of a titanium Ti, the second source/drain metal layer 156 is removed in the channel portion by a dry etching process and the first source/drain metal layer 154 is removed by a wet etching process in the channel portion. On the contrary, in case where the second source/drain metal layer 156 is made of a titanium Ti and the first source/drain metal layer 154 is made of a molybdenum Mo, the second source/drain metal layer 156 is removed by a wet etching process in the channel portion and the first source/drain metal layer 154 is removed by a dry etching process in the channel portion. Accordingly, the drain electrode 112 is separated from the data line 104 including the source electrode. Thereafter, the ohmic contact layer 150 is removed by a dry etching process using the photo-resist pattern 168 to thereby expose the active layer 148.

Figure 10E:
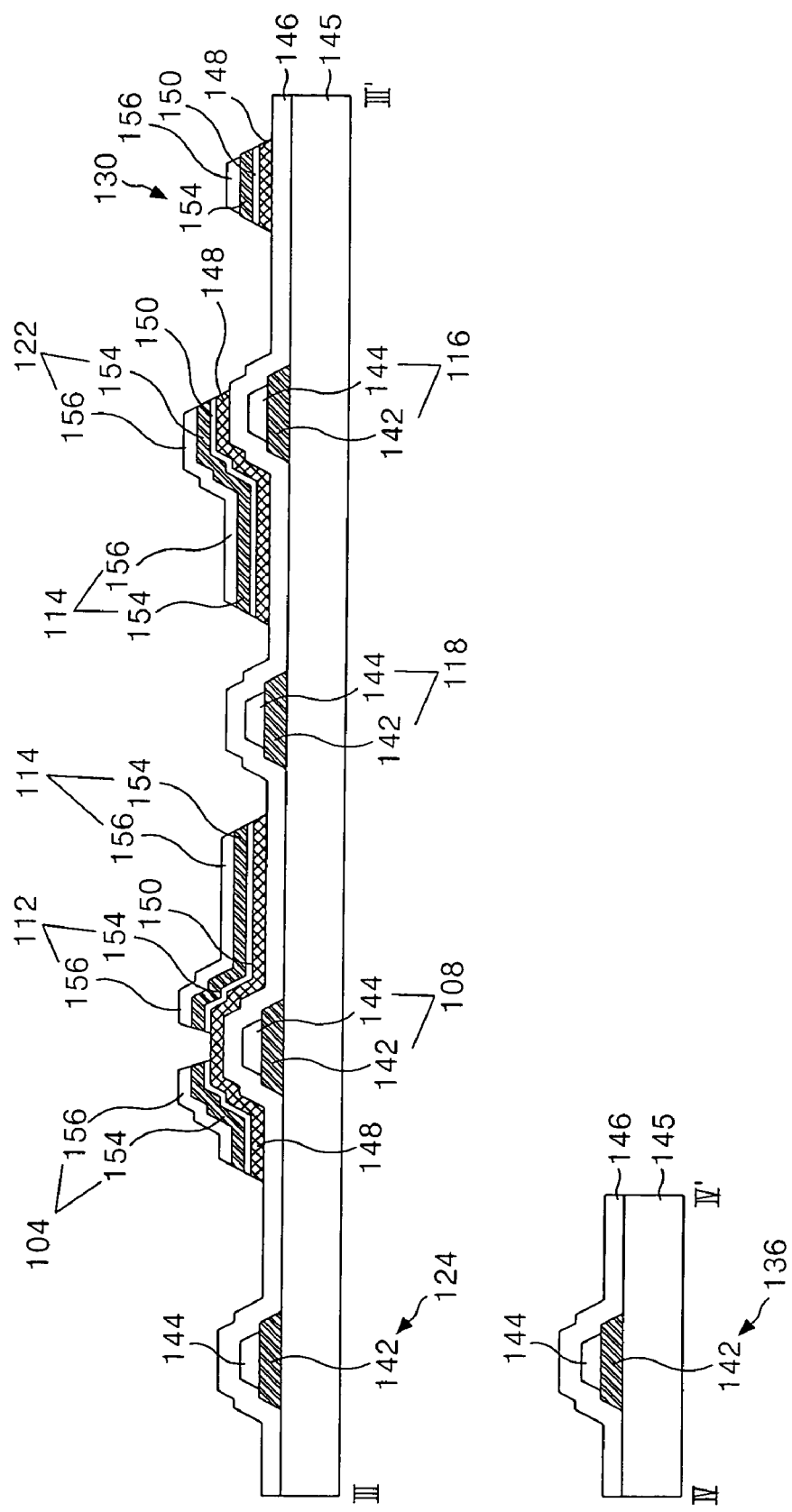
Figure 10F:
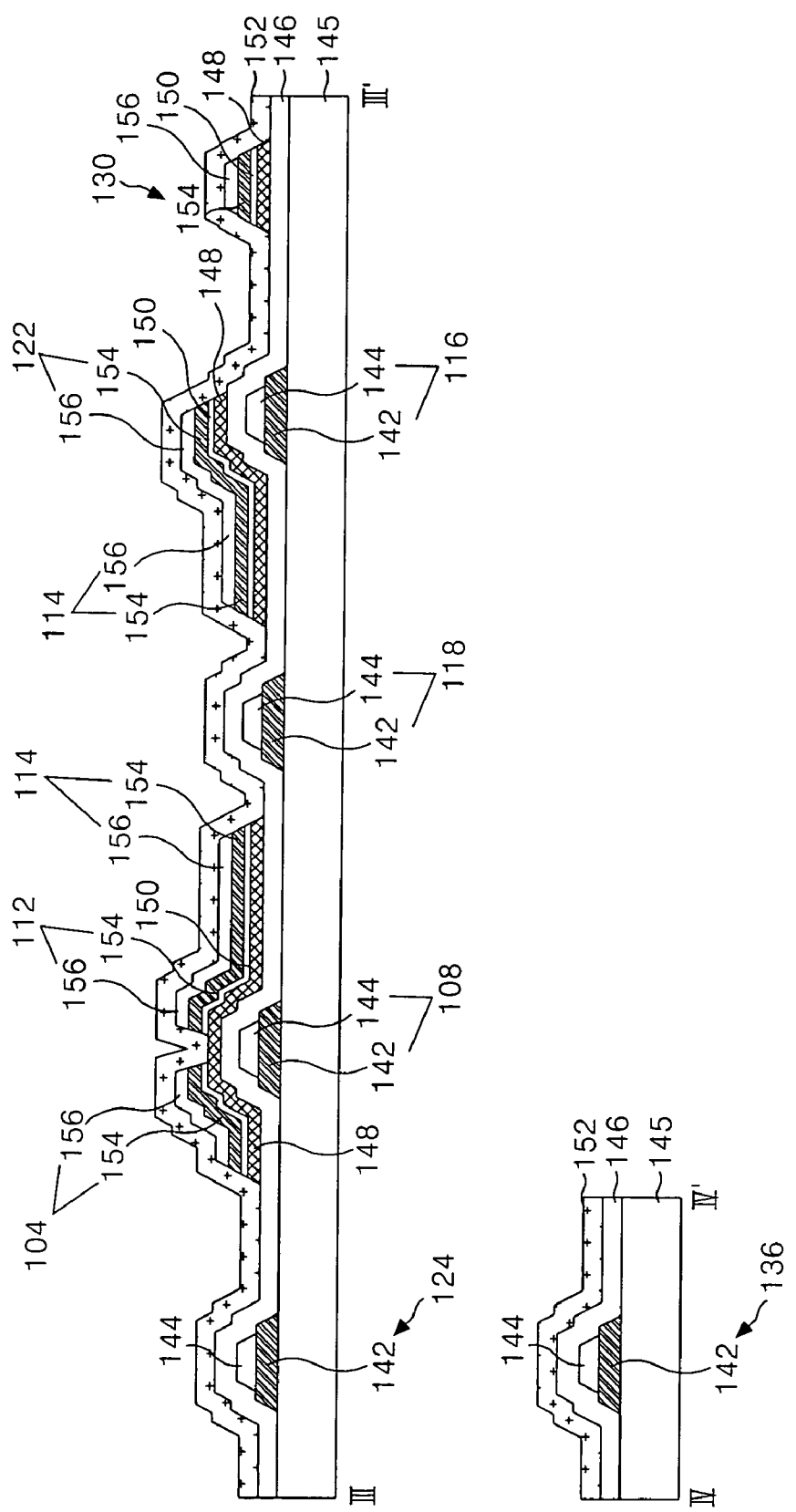

Further, a remainder of the photo-resist pattern 168 left on the second conductive pattern group is removed by a stripping process as shown in FIG. 10E.

Thereafter, a passivation film 152 is formed on the gate insulating film 146 having the second conductive pattern group thereon. The passivaion film 152 is made of an inorganic insulating material such as the gate insulating film 146 or an organic insulating material having a small dielectric constant such as an acrylic organic compound, BCB (benzocyclobutene) or PFCB (perfluorocyclobutane), etc.

Subsequently, an aliment film (not shown) is formed on the passivation film 152 in a display area except for a pad region in which the gate pad 124, the data pad 130 and the common pad 136 are located on the thin film transistor having the passivation film 152.

Figure 11A:
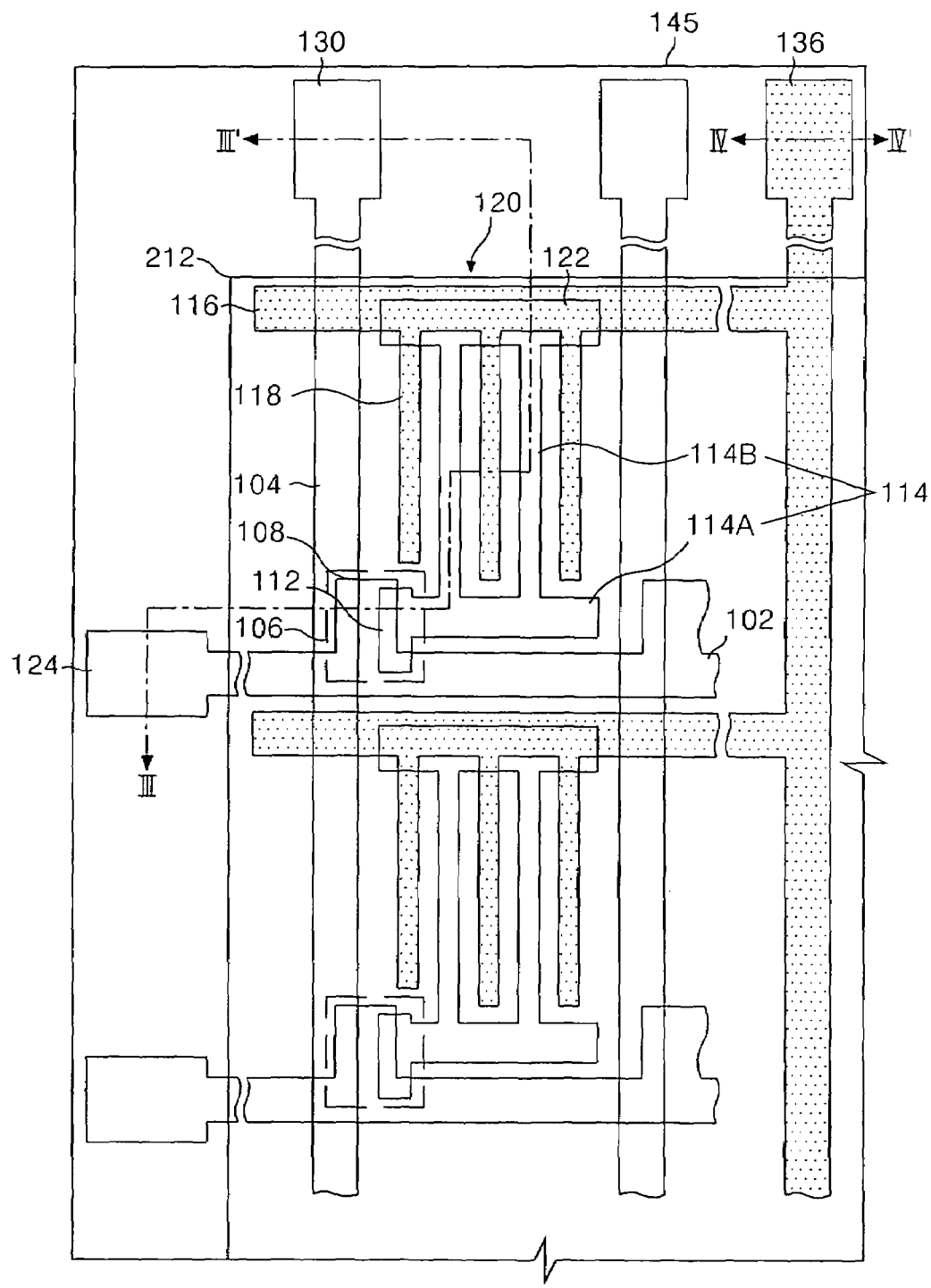

FIGS. 11A and 11B are a plan view and a sectional view for representing a pad opening process exposing a pad using a color filter array substrate as a mask, respectively.

As shown in FIG. 11A and FIG. 11B, the gate pad 124, the common pad 136 and data pad 130 is exposed using the pad opening process.

The pad opening process will be described in detail with reference to FIGS. 12A to 12B.

Figure 12A:
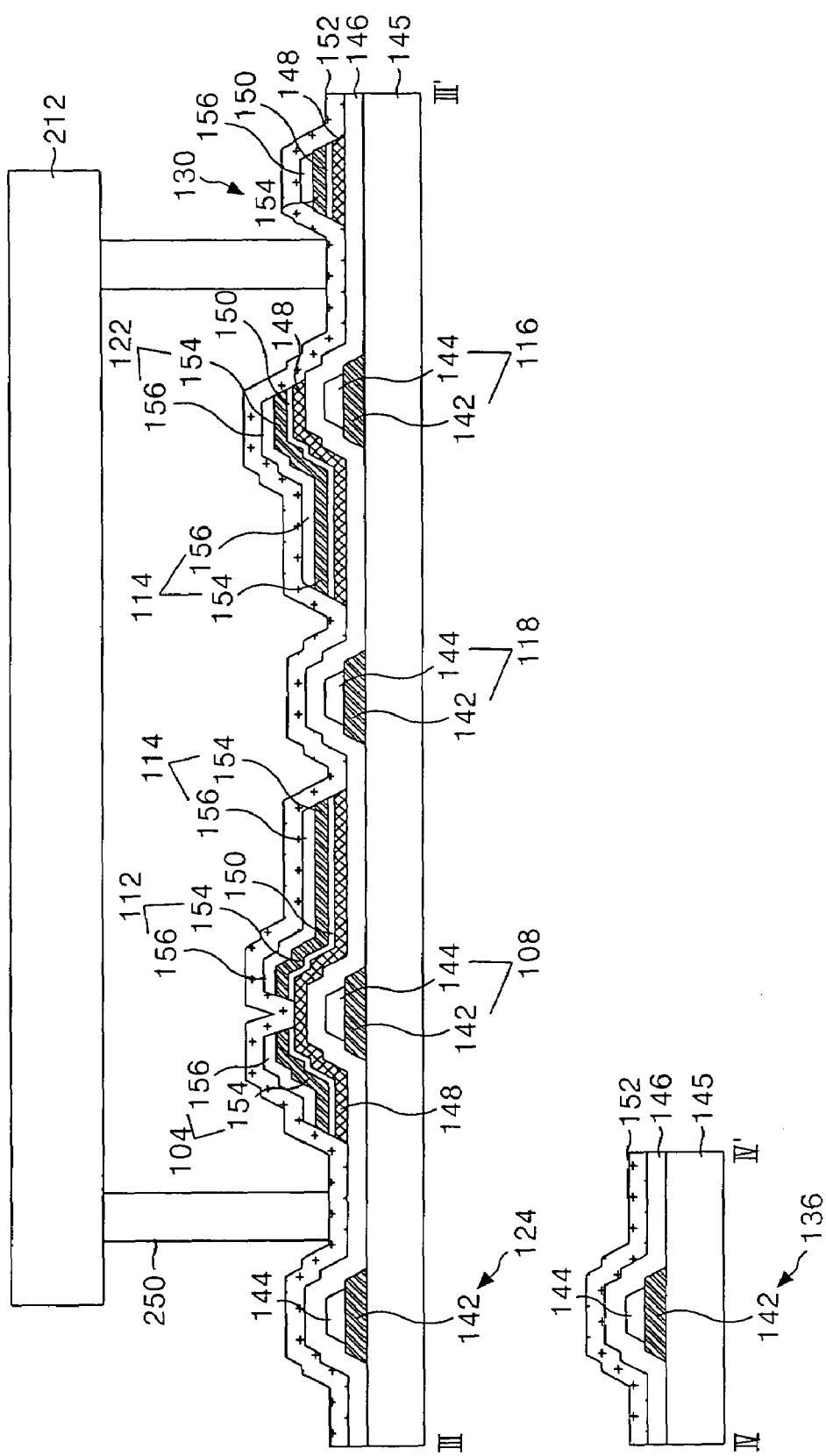
FIGS. 12A to 12B are sectional views for concretely explaining the pad opening process according to the embodiment of the present invention.

On the lower substrate 145, the thin film transistor array substrate having the thin film transistor array thereon formed using the first and the second mask process and the color filter array substrate formed using a separate process are prepared, and combined and then the thin film transistor array substrate and the color filter array substrate 212 are combined using a sealant 250 as shown in FIG. 12A. In this case, the color filter array substrate 212 is combined with the thin film transistor array substrate so as to expose a pad region where the gate pad 124, the data pad 130 and the common pad 136 are formed on the thin film transistor array substrate.

Figure 12B:
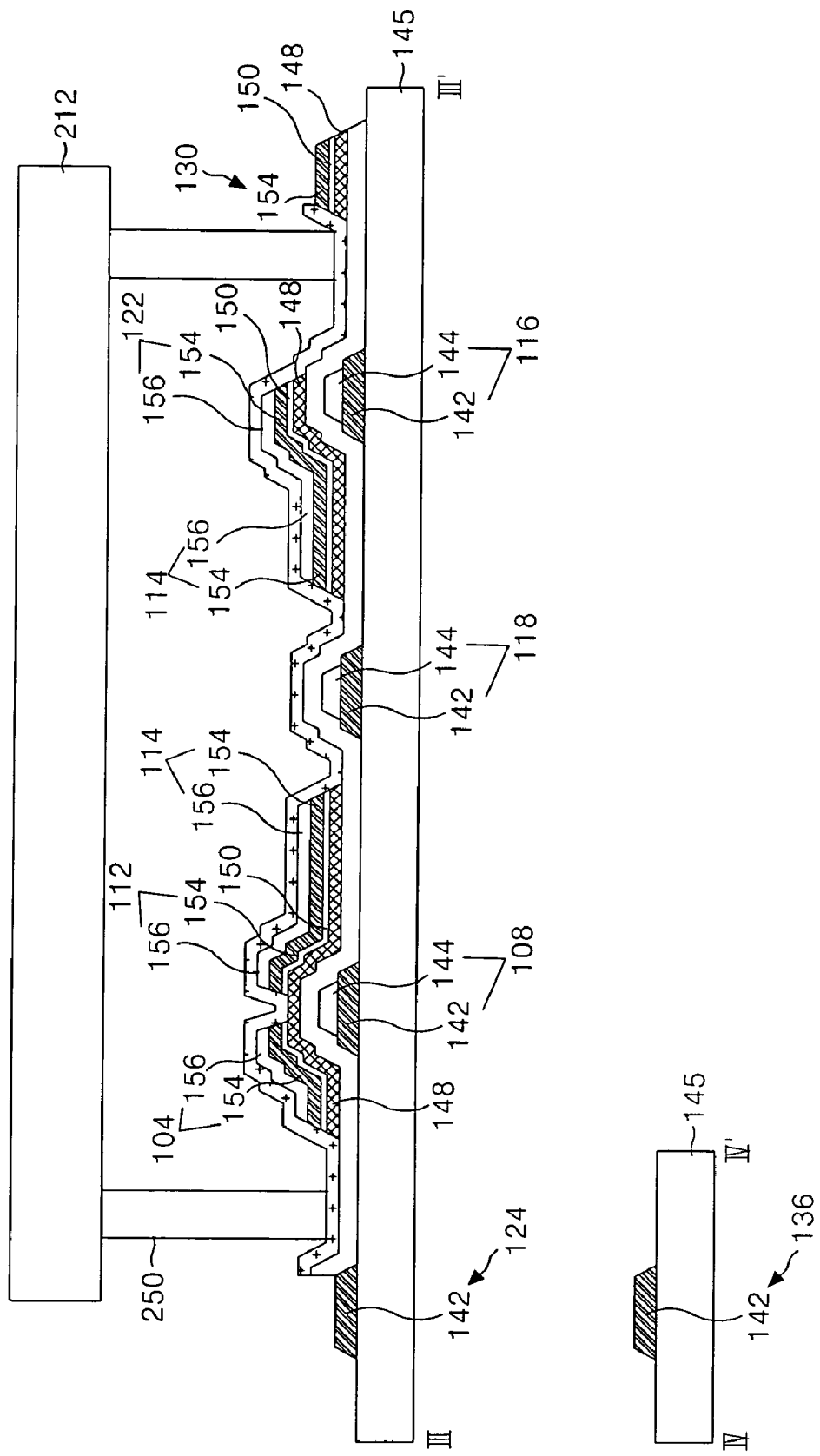

Subsequently, the passivation film 152 and the gate insulating film 146 are patterned in the way of an etching process using the color filter array substrate as a mask such that the gate pad 124, the common pad 130 and the data pad 130 are exposed as shown in FIG. 12B.

The gate pad 124, the data pad 130 and the common pad 136 have structure in which a metal layer with a high strength and corrosion resistance. In this case, the gate pad 124, the data pad 130 and the common pad 136 have two structures as shown in FIGS. 13 and 14.

For instance, in case where the first gate metal layer 142 of a lower portion is made of a titanium Ti and the second gate metal layer 144 of an upper portion is made of a molybdenum Mo, the gate pad 124 and the common pad 136 are consisted of only the first gate metal layer 142 of the lower portion as shown in FIG. 13. This is because the second gate metal layer 144 of the upper portion is removed during the pad opening process.

Figure 14:
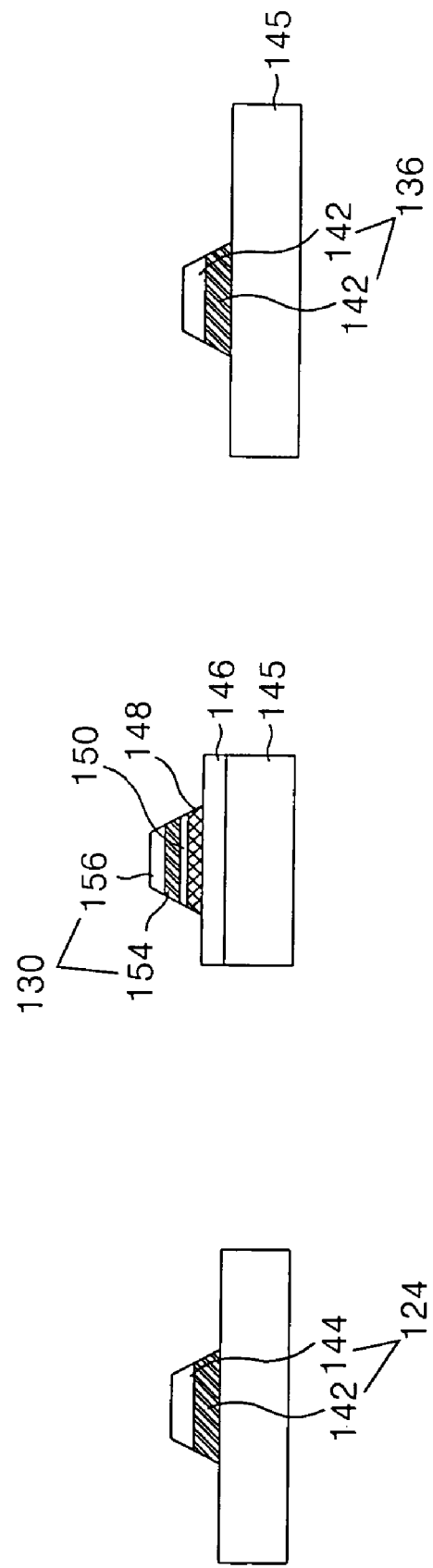
FIG. 14 is a sectional view showing pads of a second structure in the thin film transistor substrate according to the embodiment of the present invention.

On the contrary, in case where the first gate metal layer 142 of the lower portion is made of a molybdenum Mo and the second gate metal layer 144 of the upper portion is made of a titanium Ti, the gate pad 124 and the common pad 136 have a double-layer structure of metal layers in which the first and the second gate metal layers 142 and 144 are stacked as shown in FIG. 14. Also, the gate pad 124 and the common pad 136 have structure in which the gate metal layer 144 of the upper portion is exposed through the use of the pad opening process.

Further, in case where the first source/drain metal layer 154 of the lower portion is made of a titanium Ti and the second source/drain metal layer 156 of the upper portion is made of a molybdenum Mo, the data pad 130 is consisted of only the first source/drain metal layer 154 of the lower portion as shown in FIG. 13. This is because the second source/drain metal layer 156 is removed during the pad opening process.

On the contrary, in case where the first source/drain metal layer 154 of the lower portion is made of a molybdenum Mo and the second source/drain metal layer 156 is made of a titanium Ti, the data pad 130 has a double-layer structure of metal layers in which the first and the second source/drain metal layers 154 and 156 are stacked as shown in FIG. 14. Also, the data pad 130 has structure in which the source/drain metal layer 156 of the upper portion is exposed through the use of the pad opening process.

Figure 15A:
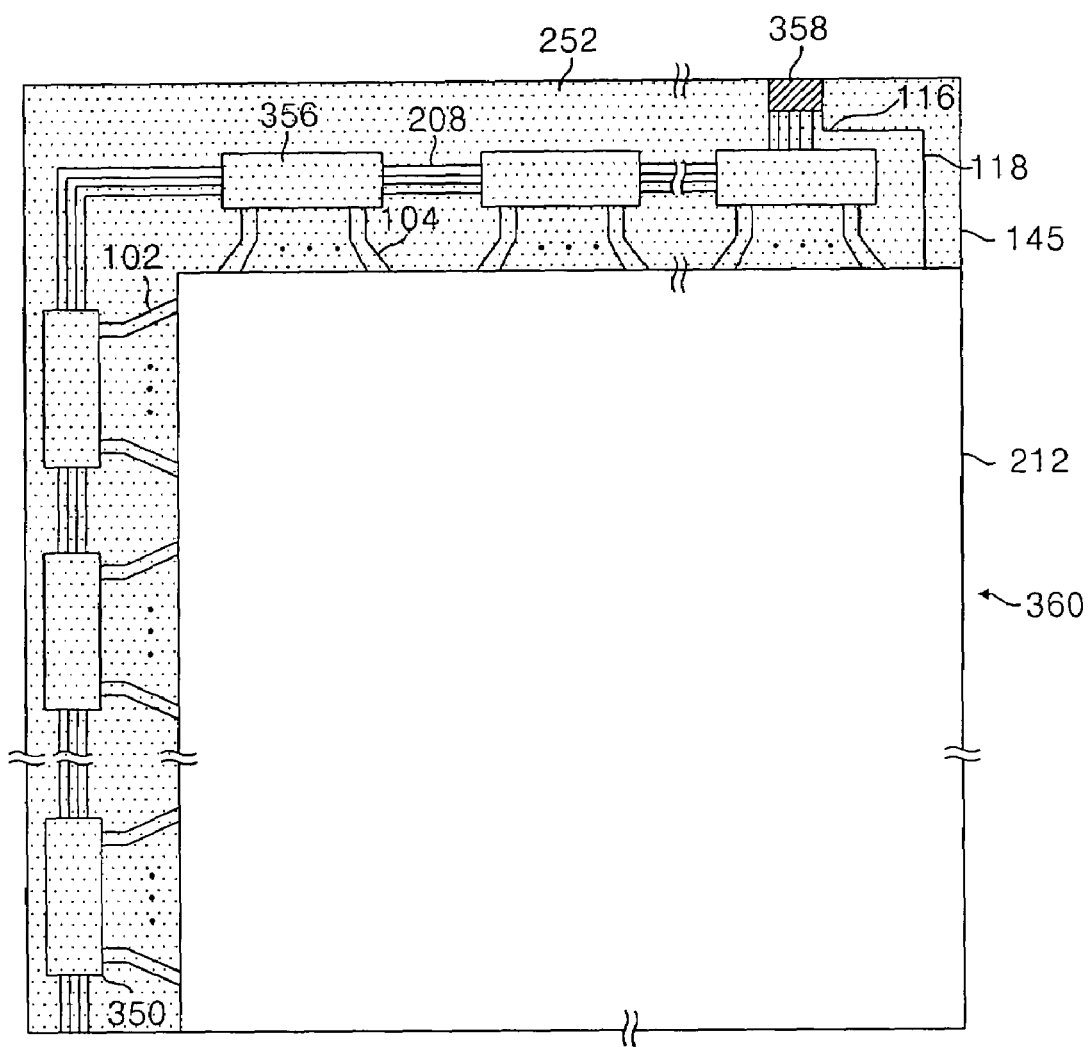
FIGS. 15A and 15B are a plan view and a sectional view for representing the drive IC mounted to the pads shown in FIGS. 13 and 14, respectively.
Figure 15B:
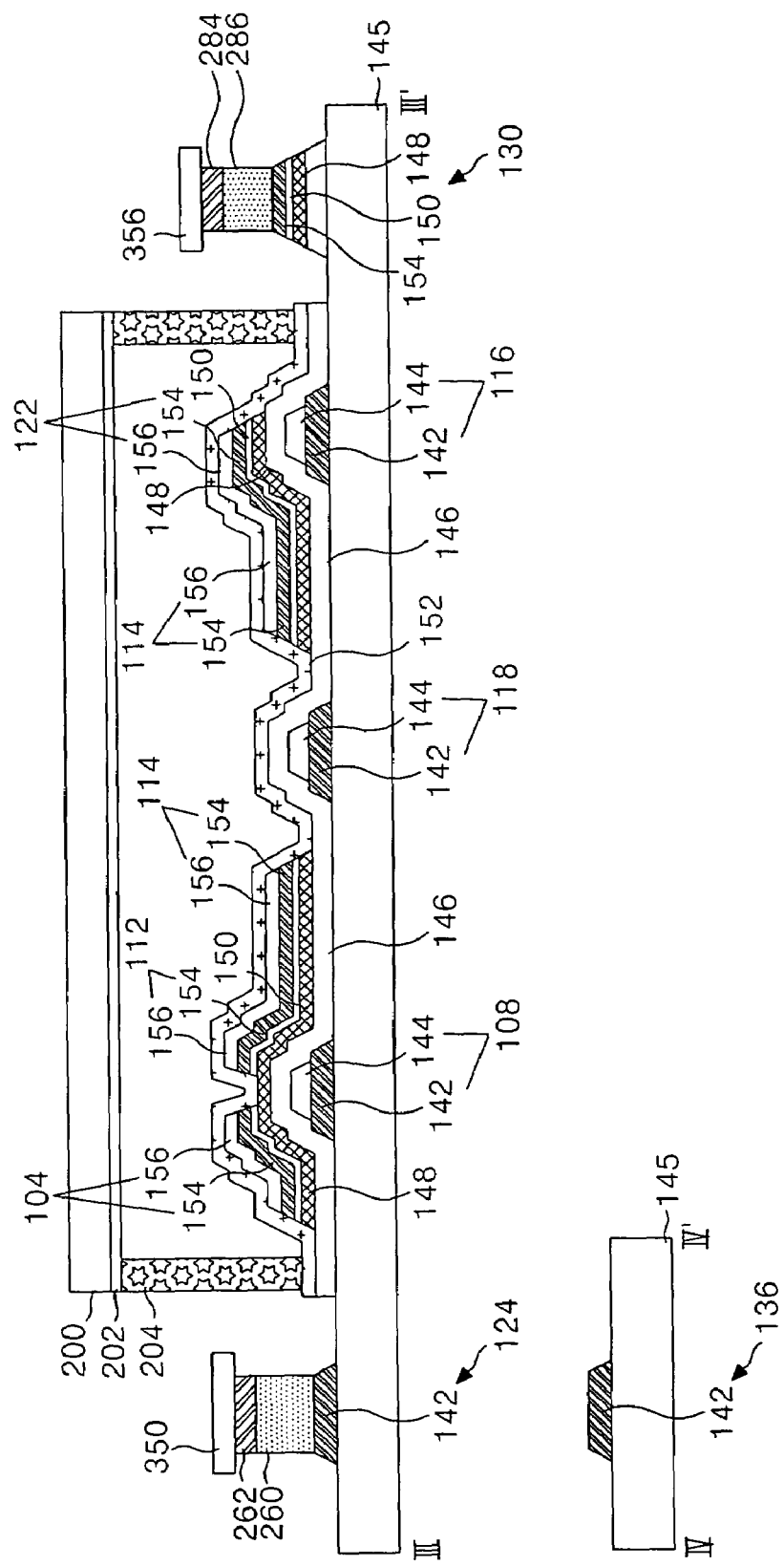

As shown in FIG. 15A and FIG. 15B, the exposed pads 124 and 130 of the pad region on the lower substrate 145 are directly contacted with the drive ICs 350 and 356 via the bump 260 and 286. That is, the output terminal 262 of the gate drive IC 350 is contacted with the gate pad 124 via the output bump 260 and the output terminal 284 of the data drive IC 356 is contacted with the data pad 130 via the output bump 268. In this case, the gate pad 124 and the data pad 130 have the exposed structure of metal layer that has a relatively high strength and corrosion resistance are directly contacted with their corresponding drive ICs 350 and 356 such that corrosion of the exposed metal layer is prevented.

Figure 16A:
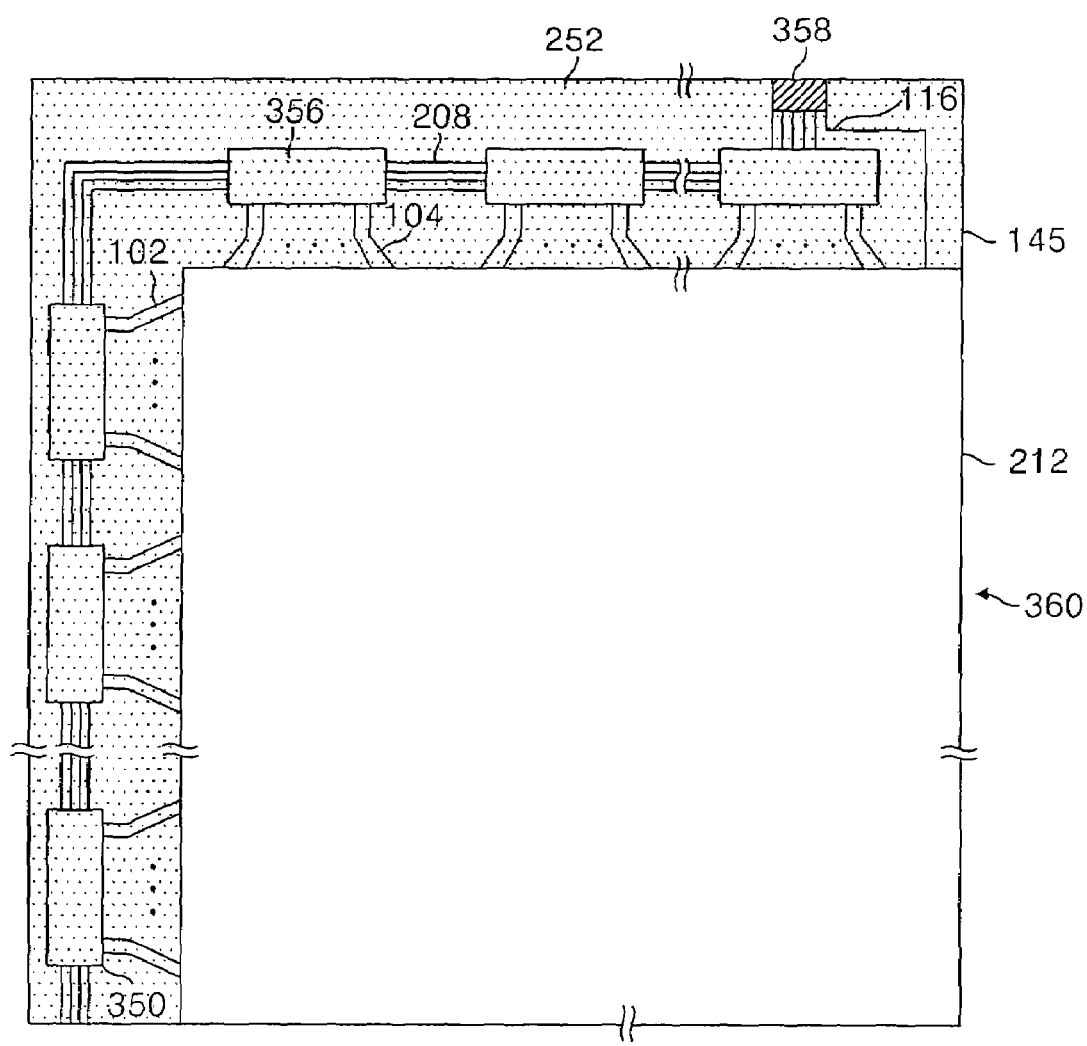
FIGS. 16A and 16B are a plan view and a sectional view for representing a first package mold material formed at pad region on the thin film transistor array substrate.
Figure 16B:
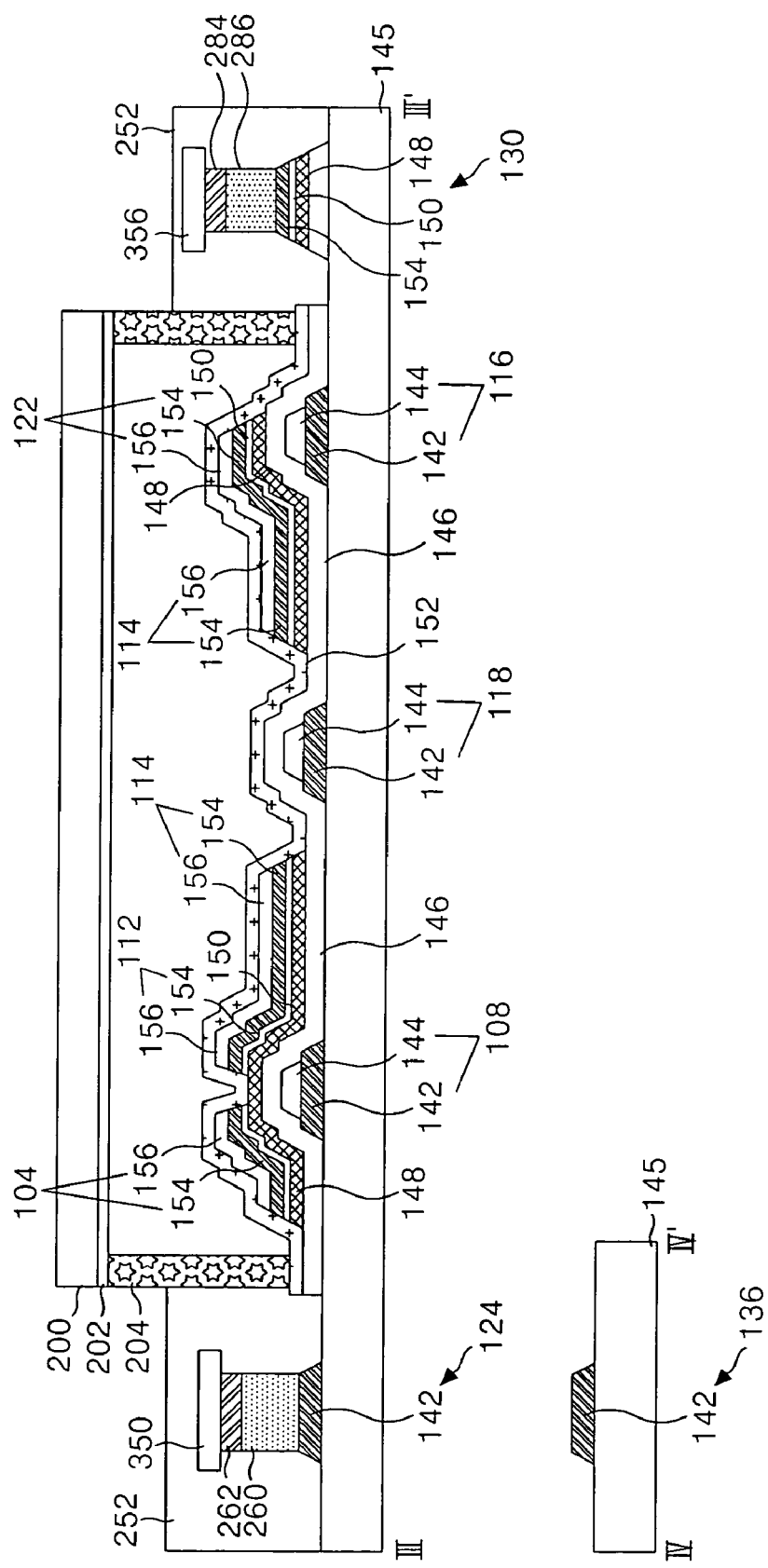

On an area except for a COG connector 358 of the lower substrate 145 on which the gate drive IC 350 and the data drive IC 356 are mounted, a first package mold material 252 is formed as shown in FIG. 16A and FIG. 16B. The first package mold material 252 is formed to partially capsulate the signal supplying line 208, the gate drive IC 350, the gate pad 124, the data drive IC 356 and the data pad 130 as exposed. Otherwise the first package mole material is formed to capsulate, an entirely exposed area on lower substrate 145 not being overlapped with the upper substrate 200, that is, the signal supplying line 208, the gate drive IC 350 and the data drive IC 356.

Figure 17A:
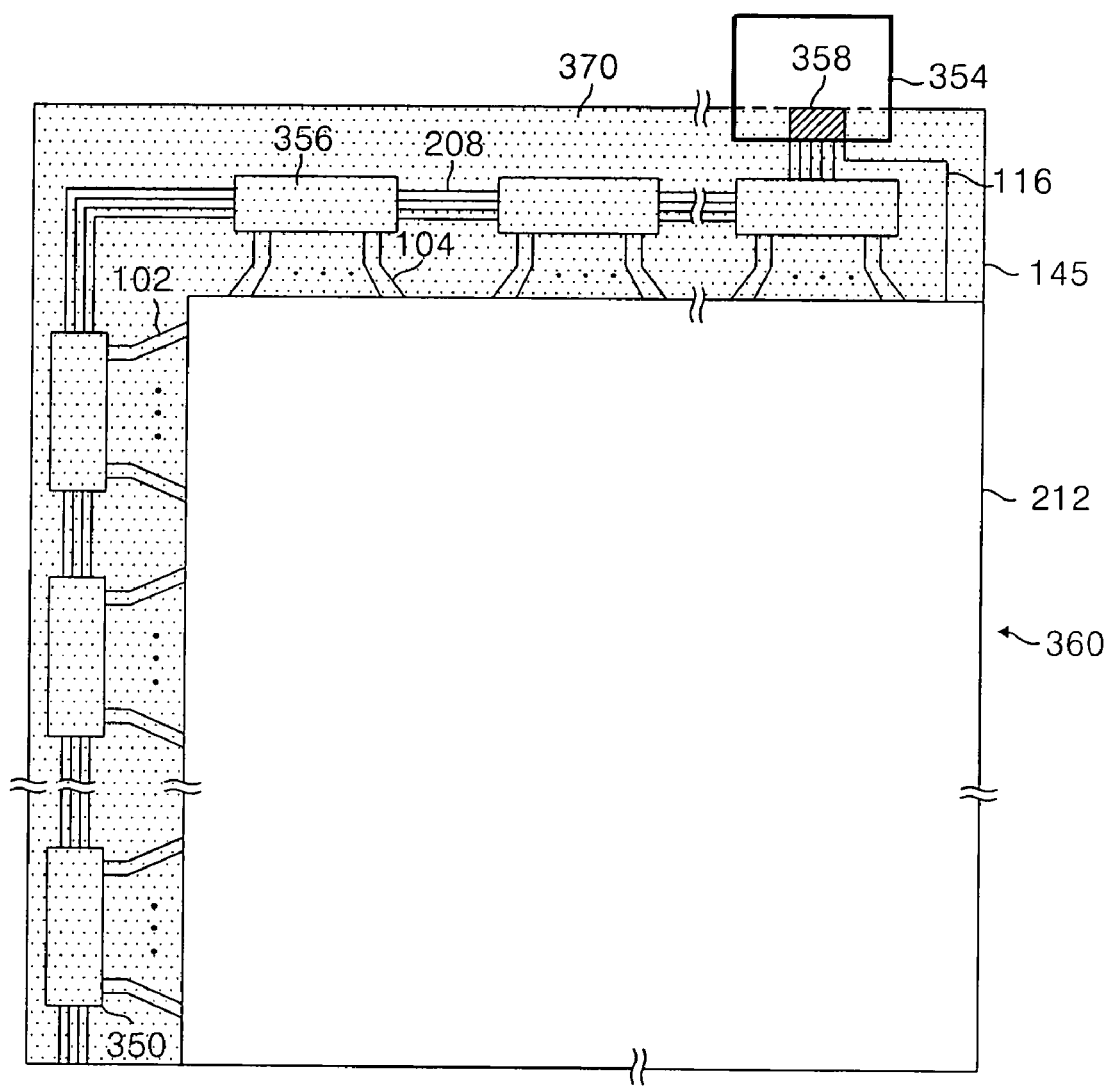

Subsequently, the COG connector 358 connected to the signal supplying line 208 is connected with the FPC 354 using the TAB process as shown in FIG. 17A and FIG. 17B. That is, an input pad of the FPC 354 is connected to the PCB 352 and an output pad of the FPC 354 is connected to the COG connector 288. Further, any one of output pads 282 of the FPC 354 is connected to the common pad 136 using the ACF 182 including the conductive ball 184 to thereby supply the reference voltage for driving the liquid crystal to the common line 116. The FPC 354 supplies gate control signals and power source signals from timing controller and a power source portion on the PCB 352 to the corresponding drive ICs 350 and 356.

Figure 18A:
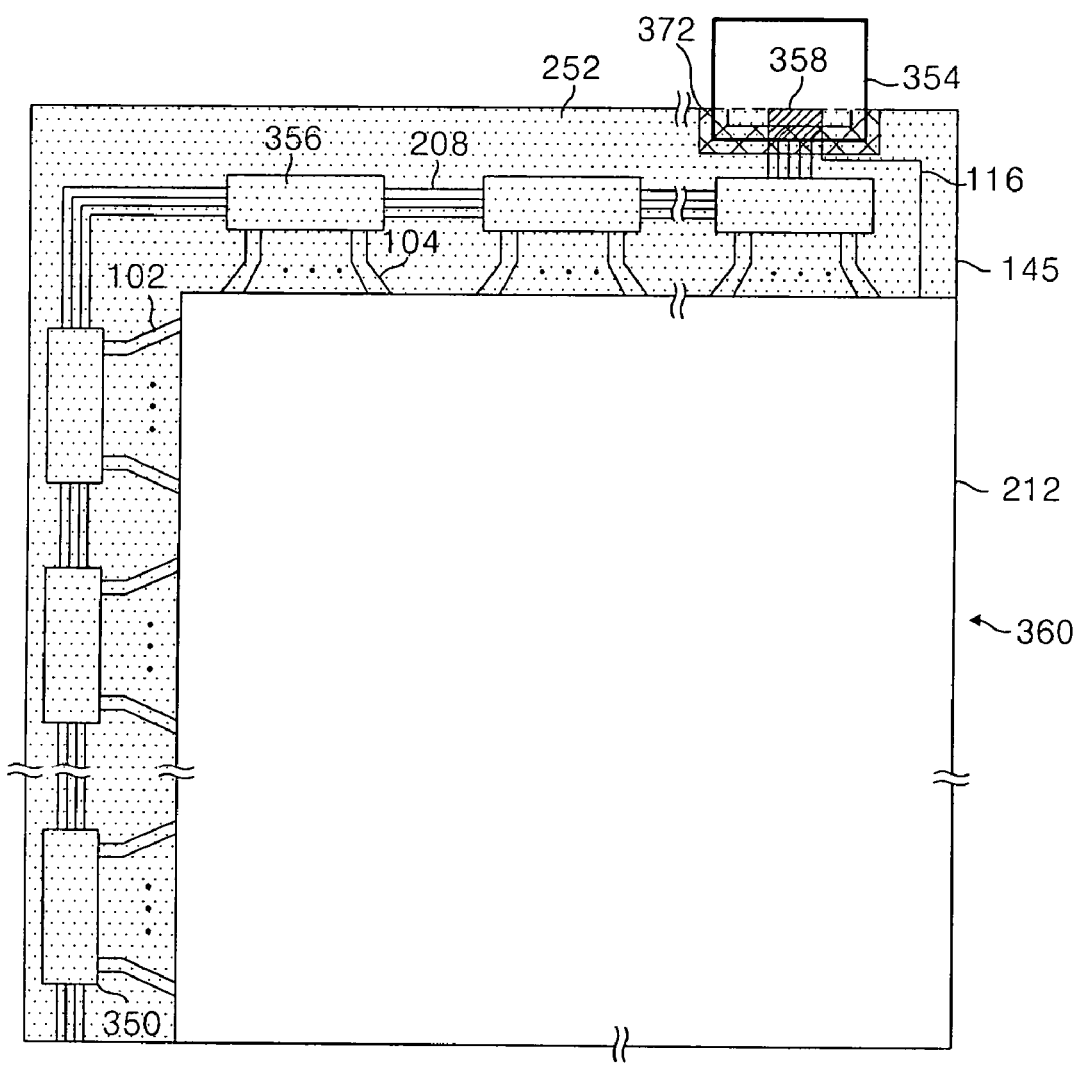
FIGS. 18A and 18B are a plan view and a sectional view for representing a second package mold material formed at pad region on the thin film transistor array substrate.
Figure 18B:
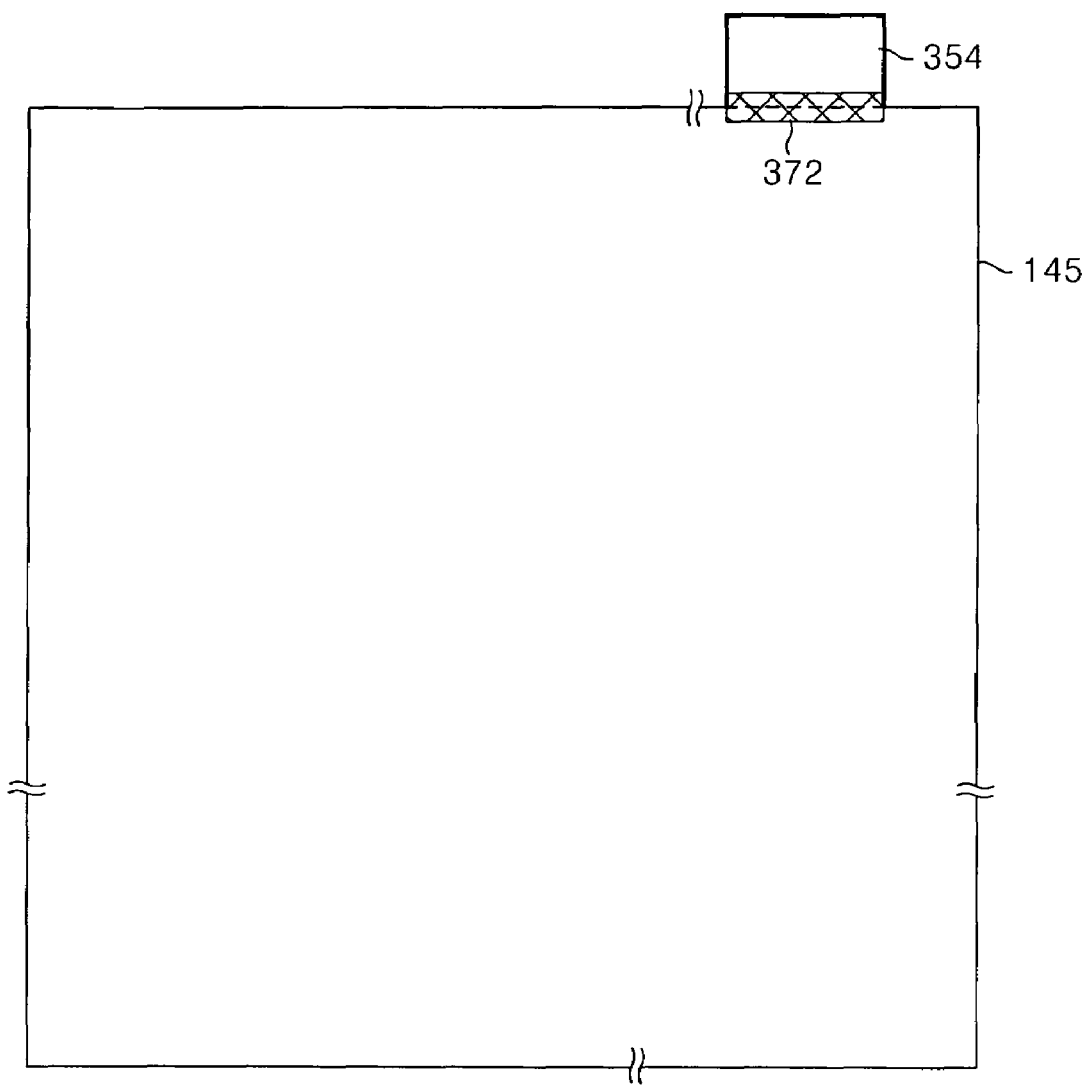

Next, a second package mold material 372 is formed at a boundary portion of the COG connector 358 and the FPC 354 and a boundary of the lower substrate 145 and the FPC 354 as shown in FIG. 18A and FIG. 18B. The second package mold material 372 is packaged for protecting the boundary portion of the COG connector 358 and the FPC 354 as shown in FIG. 18A and the boundary of the lower substrate 145 and the FPC 354 as shown in FIG. 18B.

As described above, according to the thin film transistor array substrate of horizontal electric field applying type and the manufacturing method of the present invention, the pixel electrode is formed as an identical metal to the drain electrode, and the pads have the structure wherein a metal layer having a high strength and corrosion resistance is exposed in order to prevent the defect caused by the opening.

Further, the thin film transistor array substrate of horizontal electric field applying type and the fabricating method of the present invention combine the thin film transistor array substrate formed using the two-round mask process and the color filter array substrate and then expose the pad to contact with the drive IC using the pad opening process. Accordingly, according to the thin film transistor array substrate of horizontal electric field applying type and the fabricating method thereof according to the present invention, it is possible to manufacture the thin film transistor array substrate using the two-round mask process and therefore to simplify the structure and process of the thin film transistor array substrate, to thereby reduce the manufacturing cost and improve the manufacture yield.

Moreover, according to the liquid crystal display of horizontal electric applying type and the manufacturing method the present invention, a drive IC mounted on a substrate by a COG system directly is directly connected to a pad, the drive IC and the pad as connected are packaged using a mold material. Accordingly, it is possible to protect the drive IC and the pad from exterior substances and to prevent a corrosion of an entirely exposed signal supplying line and a side exposed pad.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display of horizontal electric field applying type comprising:
 a thin film transistor array substrate, wherein the thin film transistor array substrate includes an effective display area having a gate line, a common line parallel to the gate line, a data line crossing and isolated from the gate line and the common line with a gate insulating film therebetween to define a pixel area, a thin film transistor formed at each crossing of the gate line and the data line, a passivation film for protecting the thin film transistor, a common electrode formed in the pixel area and connected to the common line, and a pixel electrode connected to the thin film transistor and formed to produce a horizontal electric field along with the common electrode in the pixel area, and a pad area having a gate pad formed to have at least one conductive layer included in the gate line, a data pad formed to have at least one conductive layer included in the data line, and a common pad formed to have at least one conductive layer included in the common line;

a color filter array substrate facing the thin film transistor array substrate;

a driving integrated circuit mounted on the thin film transistor substrate to directly connect to one of the gate pad and the data pad;

a package mold material for capsulating the pads and the driving integrated circuit;

a plurality of signal supplying lines for supplying a driving signal to the driving integrated circuit; and a connector to which a conductive film for supplying a driving signal to the signal supplying lines is attached, wherein the thin film transistor comprises a drain electrode formed of the same conductive layer as the pixel electrode.

2. A liquid crystal display of horizontal electric field applying type comprising:

a thin film transistor array substrate, wherein the thin film transistor array substrate includes an effective display area having a gate line, a common line parallel to the gate line, a data line crossing and isolated from the gate line and the common line with a gate insulating film therebetween to define a pixel area, a thin film transistor formed at each crossing of the gate line and the data line, a passivation film for protecting the thin film transistor, a common electrode formed in the pixel area and connected to the common line, and a pixel electrode connected to the thin film transistor and formed to produce a horizontal electric field along with the common electrode in the pixel area, and a pad area having a gate pad formed to have at least one conductive layer included in the gate line, a data pad formed to have at least one conductive layer included in the data line, and a common pad formed to have at least one conductive layer included in the common line;

a color filter array substrate facing the thin film transistor array substrate;

a driving integrated circuit mounted on the thin film transistor substrate to directly connect to one of the gate pad and the data pad;

a package mold material for capsulating the pads and the driving integrated circuit;

a plurality of signal supplying lines for supplying a driving signal to the driving integrated circuit; and a connector to which a conductive film for supplying a driving signal to the signal supplying lines is attached.

3. The liquid crystal display of horizontal electric field applying type according to claim 2, wherein the passivation film is formed on the effective display area except for the pad area.

4. The liquid crystal display of horizontal electric field applying type according to claim 2, wherein the driving integrated circuit includes a gate driving integrated circuit connected to the gate pad.

5. The liquid crystal display of horizontal electric field applying type according to claim 4, wherein the driving integrated circuit further includes a data driving integrated circuit connected to the data pad.

6. The liquid crystal display of horizontal electric field applying type according to claim 2, further comprising a second package mold material for capsulating a boundary portion of the connector and the conductive film and a boundary portion of the lower substrate and the conductive film.

7. The liquid crystal display of horizontal electric field applying type according to claim 2, wherein each of the gate line and the common line includes a main conductive layer and a subsidiary conductive layer for providing against an opening of the main conductive layer.

8. The liquid crystal display of horizontal electric field applying type according to claim 7, wherein each of the gate pad and the common pad includes the main conductive layer and the subsidiary conductive layer, and wherein the subsidiary conductive layer has an exposed structure.

9. The liquid crystal display of horizontal electric field applying type according to claim 7, wherein each of the gate pad and the common pad includes the subsidiary conductive layer.

10. The liquid crystal display of horizontal electric field applying type according to claim 2, wherein the data line includes a main conductive layer and a subsidiary conductive layer to protect against an opening of the main conductive layer.

11. The liquid crystal display of horizontal electric field applying type according to claim 10, wherein the data pad includes the main conductive layer and the subsidiary conductive layer, and wherein the subsidiary conductive layer has an exposed structure.

12. The liquid crystal display of horizontal electric field applying type according to claim 10, wherein the data pad includes the subsidiary conductive layer.

13. The liquid crystal display of horizontal electric field applying type according to claim 2, wherein the thin film transistor comprises:

a gate electrode connected to the gate line;

a source electrode connected to the data line;

a drain electrode facing the source electrode; and a semiconductor layer overlapping the gate electrode with the gate insulating film therebetween to form a channel portion between the source electrode and the drain electrode.

14. The liquid crystal display of horizontal electric field applying type according to claim 13, wherein the drain electrode and the pixel electrode are made of an identical conductive layer.

15. The liquid crystal display of horizontal electric field applying type according to claim 13, wherein the with semiconductor layer is formed on the gate insulating film along the data line, the source electrode, the drain electrode and the pixel electrode.

16. A method for fabricating a liquid crystal display of horizontal electric field applying type, comprising:

preparing a thin film transistor array substrate having an effective display area and a pad area formed on a lower substrate, wherein the effective display area includes a gate line, a common line parallel to the gate line, a data line crossing the gate line and the common line with a gate insulating film therebetween to define a pixel area, a thin film transistor formed at each crossing of the gate line and the data line, a passivation for protecting the thin film transistor, a common electrode formed in the pixel area and connected to the common line and a pixel electrode connected to the thin film transistor and formed to produce horizontal electric field along with the common electrode in the pixel area, and the pad area includes a gate pad formed having at least one conductive layer included in the gate line, a data pad formed having at least one conductive layer included in the data line, and a common pad formed having at least one conductive layer included in the common line;

preparing a color filter array substrate facing the thin film transistor array substrate;

combining the thin film transistor array substrate and the color filter array substrate to expose the pad area;

exposing the common pad, the gate pad and the data pad;

mounting a driving integrated circuit on the substrate to directly connect to one of the gate pad and the data pad;

capsulating a pad connected with the driving integrated circuit with a package mold material;

forming a plurality of signal supplying lines for supplying a driving signal to the driving integrated circuit; and attaching a connector to the signal supplying lines with a conductive film to supply a driving signal to the signal supplying lines, wherein the thin film transistor comprises a drain electrode formed of the same conductive layer as the pixel electrode.

17. A method for fabricating a liquid crystal display of horizontal electric field applying type, comprising:

preparing a thin film transistor array substrate having an effective display area and a pad area formed on a lower substrate, wherein the effective display area includes a gate line, a common line parallel to the gate line, a data line crossing the gate line and the common line with a gate insulating film therebetween to define a pixel area, a thin film transistor formed at each crossing of the gate line and the data line, a passivation for protecting the thin film transistor, a common electrode formed in the pixel area and connected to the common line and a pixel electrode connected to the thin film transistor and formed to produce horizontal electric field along with the common electrode in the pixel area, and the pad area includes a gate pad formed having at least one conductive layer included in the gate line, a data pad formed having at least one conductive layer included in the data line, and a common pad formed having at least one conductive layer included in the common line;

preparing a color filter array substrate facing the thin film transistor array substrate;

combining the thin film transistor array substrate and the color filter array substrate to expose the pad area;

exposing the common pad, the gate pad and the data pad;

mounting a driving integrated circuit on the substrate to directly connect to one of the gate pad and the data pad;

capsulating a pad connected with the driving integrated circuit with a package mold material;

forming a plurality of signal supplying lines for supplying a driving signal to the driving integrated circuit; and attaching a connector to the signal supplying lines with a conductive film to supply a driving signal to the signal supplying lines.

18. The method according to claim 17, wherein mounting the driving integrated circuit includes connecting the gate pad and the gate driving integrated circuit.

19. The method according to claim 18, wherein mounting the driving integrated circuit further includes connecting the data pad and data driving integrated circuit.

20. The method according to claim 17, further comprising capsulating a boundary portion of the connector and the conductive film and a boundary portion of the lower substrate and the conductive film with a second package mold material.

21. The method according to claim 17, wherein preparing a thin film transistor array substrate includes:

forming, on the lower substrate, a first conductive pattern group including the gate line, a gate electrode connected to the gate line, the common line parallel to the gate line, the common electrode, the gate pad and the common pad;

forming a gate insulating film on the lower substrate having the first conductive pattern group thereon;

forming a semiconductor layer at a predetermined area on the gate insulating film and a second conductive pattern group having the date line, a source electrode of the thin film transistor connected with the data line, a drain electrode of the thin film transistor being opposite to the source electrode, a pixel electrode connected with the drain electrode and parallel to the common electrode and the data pad; and forming a passivation film to cover the second conductive pattern group.

22. The method according to claim 21, wherein exposing the gate pad and the data pad includes etching the gate insulating film and the passivation film using the color filter array substrate as a mask.

23. The method according to claim 21, wherein at least one of the first and the second conductive pattern group is formed to have a double-layered structure having a main conductive layer and a subsidiary conductive layer to protect against an opening of the main conductive layer.

24. The method according to claim 23, wherein exposing the gate pad and the data pad includes exposing the subsidiary conductive layers of the gate pad and the common pad and the subsidiary conductive layers of the data pad.

* * * * *